United States Patent
Koplow

(10) Patent No.: US 8,585,413 B2
(45) Date of Patent: Nov. 19, 2013

(54) ROTARY ELECTRICAL CONTACT DEVICE AND METHOD FOR PROVIDING CURRENT TO AND/OR FROM A ROTATING MEMBER

(75) Inventor: Jeffrey P. Koplow, San Ramon, CA (US)

(73) Assignee: Sandia Corporation, Albuquerque, NM (US)

(*) Notice: Subject to any disclaimer, the term of this patent is extended or adjusted under 35 U.S.C. 154(b) by 77 days.

(21) Appl. No.: 13/475,831

(22) Filed: May 18, 2012

(65) Prior Publication Data

US 2012/0295450 A1    Nov. 22, 2012

Related U.S. Application Data

(60) Provisional application No. 61/487,429, filed on May 18, 2011.

(51) Int. Cl.
    *H01R 39/00* (2006.01)

(52) U.S. Cl.
    USPC .......................................... 439/18

(58) Field of Classification Search
    USPC ............. 439/18, 13, 11, 20, 23, 24, 145, 296; 244/2, 50, 12, 7, 51, 17; 416/168, 2, 416/189; 180/116, 117
    See application file for complete search history.

(56) References Cited

U.S. PATENT DOCUMENTS

| | | | |
|---|---|---|---|
| 5,182,968 A * | 2/1993 | Mott | 474/11 |
| 5,683,318 A * | 11/1997 | Snel et al. | 474/11 |
| RE35,820 E * | 6/1998 | Guginsky | 174/102 R |
| 5,871,411 A * | 2/1999 | Senger et al. | 474/11 |
| 6,099,424 A * | 8/2000 | Tsai et al. | 474/12 |
| 6,537,176 B2 * | 3/2003 | Fessler | 477/45 |
| 7,174,245 B2 * | 2/2007 | Ries-Mueller et al. | 701/51 |
| 7,270,591 B2 * | 9/2007 | Deshpande et al. | 451/5 |
| 7,301,100 B2 * | 11/2007 | Drane et al. | 174/67 |
| 7,371,150 B2 * | 5/2008 | Deshpande et al. | 451/5 |
| 7,837,537 B2 * | 11/2010 | Wall et al. | 451/296 |
| 7,959,104 B2 * | 6/2011 | Kuntz | 244/2 |
| 7,959,361 B2 * | 6/2011 | Lu et al. | 385/53 |
| 8,100,791 B2 * | 1/2012 | Yamaguchi et al. | 474/28 |
| 8,202,008 B2 * | 6/2012 | Lu et al. | 385/53 |
| 2001/0044349 A1 * | 11/2001 | Tanigawa et al. | 474/8 |
| 2003/0081905 A1 * | 5/2003 | Bethea et al. | 385/55 |
| 2006/0231282 A1 * | 10/2006 | Greenfield | 174/67 |
| 2009/0286411 A1 * | 11/2009 | Bazayev et al. | 439/145 |

(Continued)

OTHER PUBLICATIONS

International Search Report of the International Searching Authority dated May 18, 2011 for PCT/US2012/038698.

*Primary Examiner* — Alexandr Gilman
(74) *Attorney, Agent, or Firm* — Dorsey & Whitney LLP

(57) ABSTRACT

Examples of rotary electrical connectors include a first pair and a second pair of opposing sheaves coupled together by intersecting first shaft connecting the first pair of opposing sheaves and a second shaft connecting the second pair of opposing sheaves, and at least partially electrically conductive belt disposed about respective perimeters of the first pair and second pair of opposing sheaves and adapted to remain in contact with at least a portion of the respective perimeters of the sheaves during motion of said sheaves. In example devices, one of the plurality of sheaves may remain stationary during operation of the device while the remaining sheaves rotate and/or orbit around a center axis of the stationary sheave, the device being configured to couple current between a stationary power source and a rotating member through the electrically conductive belt.

24 Claims, 19 Drawing Sheets

(56) References Cited

U.S. PATENT DOCUMENTS

2010/0184543 A1* 7/2010 Yamashita et al. ............. 474/11
2011/0104919 A1* 5/2011 Patel et al. .................... 439/137
2011/0223785 A1* 9/2011 Jiang et al. .................... 439/106
2011/0284216 A1* 11/2011 Addis et al. .............. 166/250.01
2012/0002356 A1* 1/2012 Linnane et al. .......... 361/679.01

* cited by examiner

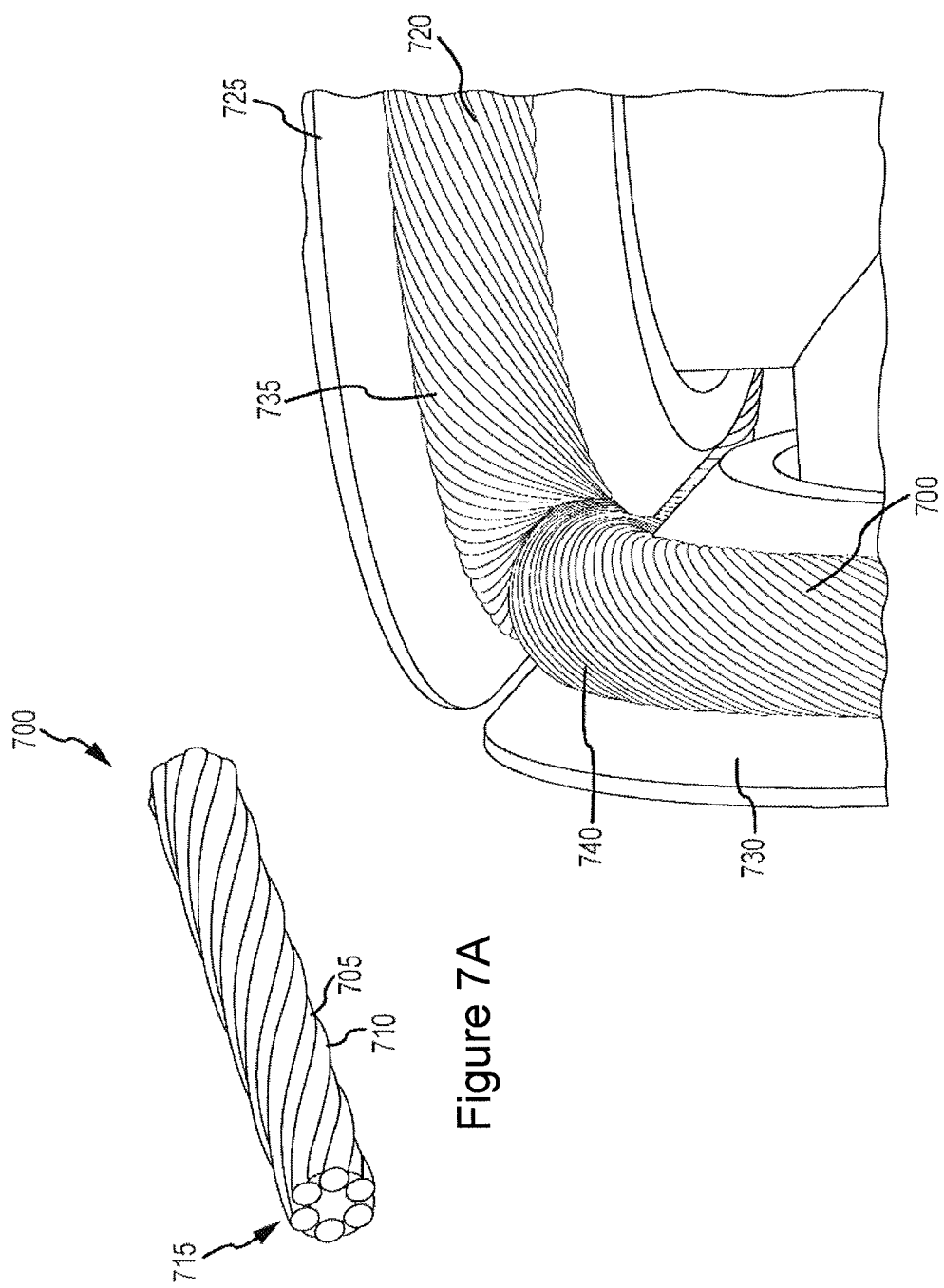

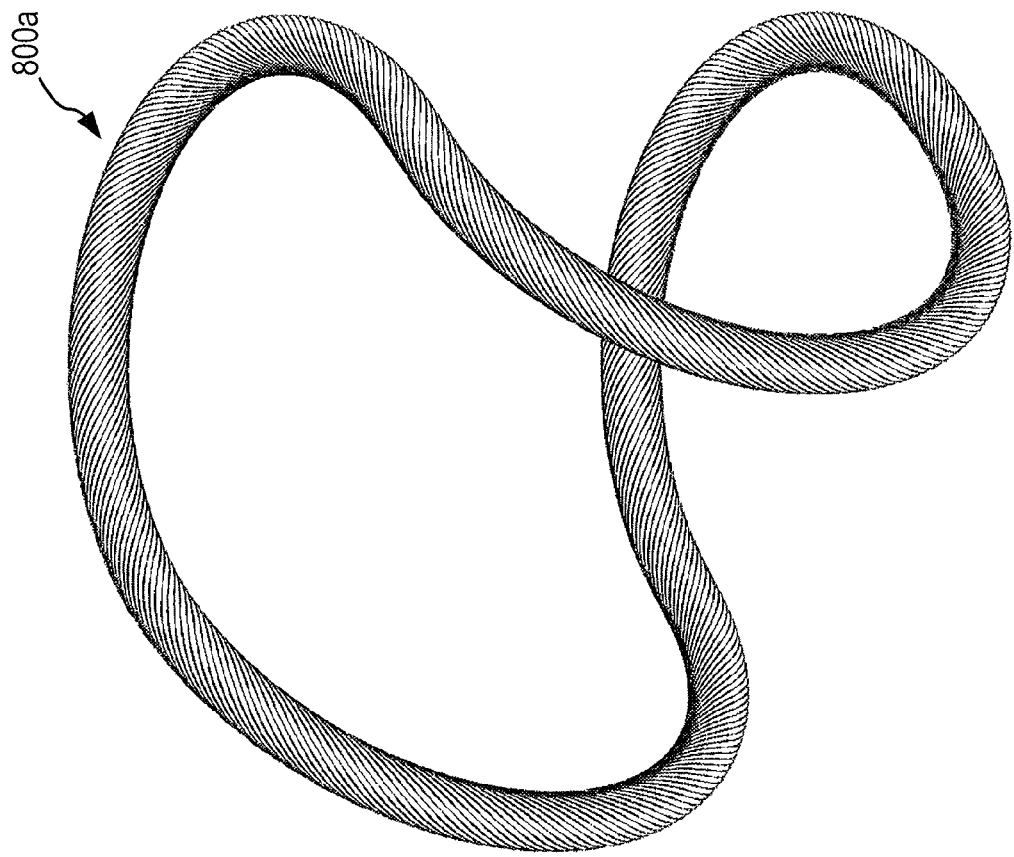
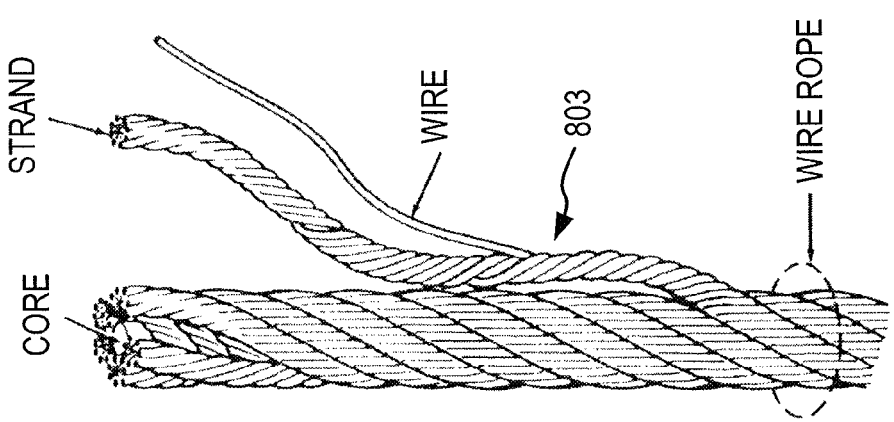
Figure 8A

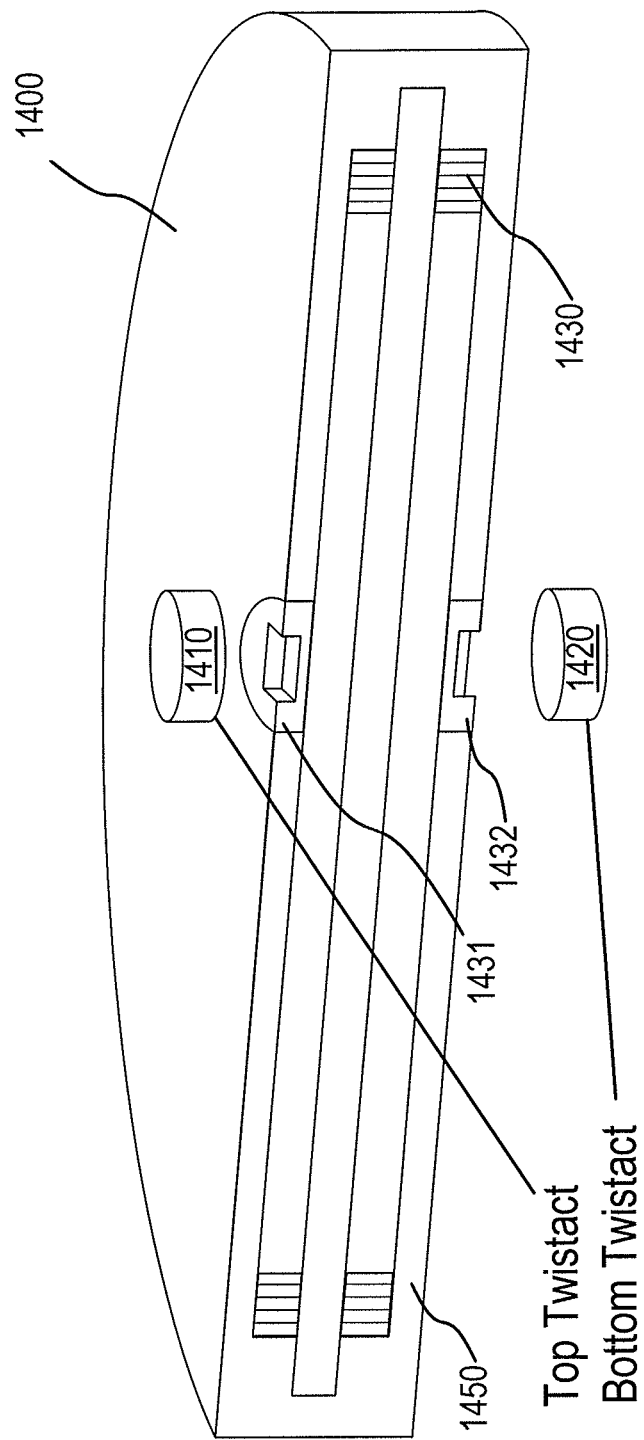

Electric Circuit

Magnetic Circuit

ROTARY ELECTRICAL CONTACT DEVICE AND METHOD FOR PROVIDING CURRENT TO AND/OR FROM A ROTATING MEMBER

CROSS-REFERENCE TO RELATED APPLICATION(S)

This application claims the benefit of the earlier filing date of provisional application No. 61/487,429, filed May 18, 2011, entitled "Homopolar motor/generator," which application is hereby incorporated by reference in its entirety, for any purpose.

STATEMENT REGARDING RESEARCH & DEVELOPMENT

The United States Government has a paid-up license in this technology and the right in limited circumstances to require the patent owner to license others on reasonable terms as provided for by the terms of contract No. DE-AC04-94AL85000 awarded by the U.S. Department of Energy to Sandia Corporation.

TECHNICAL FIELD

This application describes examples of rotary electrical contact devices that may be used with electrical motors/generators, as examples, and methods for providing electrical current between a stationary and a rotating member are described.

BACKGROUND

Electro-mechanical devices, such as motors, alternators, and electrical generators, as examples, may require that power be delivered from a stationary power source to a rotating member or that electrical power generated from a rotating member be fed back into the grid or provided to some other stationary structure. Slip rings, brushes, and commutator/brush assemblies are known in the field of electrical motors and generators, and are frequently used to provide electrical coupling between stationary and rotating components of such motors and/or generators.

A brush is a device which conducts current between stationary wires and moving parts, most commonly in a rotating shaft. A brush operates by providing a sliding contact between a stationary source and the rotating surface to which power is provided. There are numerous problems with brush technologies, for example wear and contact bounce. Contact bounce may result in intermittent loss of physical contact between the brush and moving structure, causing a momentary open circuit. This may cause electrical arcing which may ablate the surface of the brush, thereby shortening its lifespan, especially in the case of high-current brushes and/or highly inductive loads.

A conventional solution to the brush problem is to turn to a brushless motor (or brushless generator). In general, brushless motors/generators may use one or more permanent magnets at the rotor in place of an electromagnet to obviate the need for a brush type device to provide electrical current to the rotor. In the case of high-performance brushless motors/generators, rare earth permanent magnets may be used. However, the reliance on rare earth magnets to generate the desired magnetic field distribution in the rotor assembly may be a significant shortcoming because rare earth magnets are expensive and their cost continues to grow. There is also growing international concern about the environmental impact of rare earth mining and extraction operations.

SUMMARY

Examples of devices for maintaining electrical contact between a first member and a second member, wherein the second member may be moving relative to the first member, are described. In some examples, the device may include a first sheave, which may be configured to remain stationary relative to the first member during operation of the device. The first sheave may be operable to be coupled to at least one of a power source, a power sink, or other portions of one or more electrical circuits or components. The device may also include a second sheave disposed generally opposite the first circular sheave. The second sheave may be spaced apart from and rotatably coupled to the first sheave, as will be further described. The second sheave may be configured to remain stationary relative to the second member. Thus, in examples where the second member rotates with respect to the first member, the second sheave may rotate relative to the first sheave during operation of the device. The device may further include a pair of orbital sheaves disposed between the first sheave and the second sheave. The pair of orbital sheaves may be configured to revolve about the center axis of the first sheave. The device may include a belt, for example a flexible belt made in part of an electrically conductive material, which is configured to maintain electrical contact between the first sheave and the pair of orbital sheaves and between the second sheave and the pair of orbital sheaves.

In some examples, the first sheave of the device may be coupled to a power source, a power sink, and/or other portions of one or more electrical circuits or components. In some examples, the second sheave may be mechanically coupled to a rotating member, such as the shaft of a generator used in a wind turbine or the shaft of a synchronous motor, for example. The second sheave may be electrically coupled to a power sink or source, such as an electromagnet, mounted on the rotating member. Note, it will be understood that in typical embodiments substantially all of the function of such a structure, despite the use of elements such as pulleys and belts typically associated with mechanical drive systems, is to provide an uninterrupted path for transmission of electrical current rather than transmission of mechanical power or torque.

In some examples, the pair of orbital sheaves may be disposed about a perimeter of the first sheave and the second sheave. The device may also include a first shaft coupling the first sheave to the second sheave, and a second shaft coupling the pair of orbital sheaves together. In some examples, the first shaft and the second shaft may intersect at a 90 degree angle. In some examples, the first shaft and the second shaft may intersect at an angle different than 90 degrees. That is, in some examples, at least one of the first shaft or the second shaft may not be perpendicular to one or more surfaces of the respective sheaves which the shaft couples.

In some examples, the belt may be made of an electrically conductive material, and may have a generally circular cross section. In some examples, the device may be configured to provide a low friction rolling contact between the belt and respective contact surfaces of the first sheave, the second sheave, and/or the pair of orbital sheaves. In some examples, the belt may be flexible and/or bendable in a first direction, such as the transverse direction for example. In some examples, the belt may be flexible or elastic along a longitudinal direction. In some examples, the belt may be a helical coil spring having a first end connected to the second end to form a continuous closed loop. In some examples, the belt may include an alternating array of transverse disk members spaced apart by a plurality of spacers. In examples, some or all of the spacers may be compliant spacers, which may be formed of a polymeric material and/or metallic flexure or spring.

In some examples, the belt may include a bundle of elongated electrical conductors which may be twisted, braided, and/or otherwise intertwined together to form a conductive rope or cable. In some examples, each elongated electrical conductor of the conductive rope may itself include a plurality of conductive wires or fibers. That is, in some examples, a conductive rope may be formed by iteratively twisting or braiding bundles of wire to form segments of the rope until a desired thickness and/or strength is obtained. In some examples, at least some of the elongated electrical conductors may be electrically insulated from one another. In some examples, the belt, which may be implemented as a conductive rope with individual conductive paths, may be configured to apply two or more electrical signals with different values along a plurality of independent conductive paths.

Methods for providing electrical current to or from a rotating member may include providing electrical current to or from a stationary sheave, revolving a plurality of planetary sheaves about an axis of the stationary sheave, maintaining, with a belt, a rolling contact between the stationary sheave and the plurality of planetary sheaves, and between the plurality of planetary sheaves and a rotating sheave spaced apart from the stationary sheave, the rotating sheave configured to rotate while the stationary sheave remains stationary, and providing current through the belt between the stationary sheave and the plurality of planetary sheave and between the plurality of planetary sheaves and the rotating sheave.

In some examples, revolving may include rotating the rotating sheave using a shaft of a motor or generator. In some examples, revolving may further include rotating a shaft assembly which couples the plurality of planetary sheaves to the rotating sheave. In some examples, maintaining, with the belt, a rolling contact may include rolling a conductive belt about a perimeter of the stationary sheave and respective perimeters of the plurality of planetary sheaves. In some examples, maintaining, with the belt, a rolling contact may further include rolling a conductive belt about respective perimeters of the plurality of planetary sheaves and a perimeter of the rotating sheave. In some examples, providing current through the belt may include providing current along parallel paths of current from the stationary sheave to each of the plurality of planetary sheaves.

In some examples the method may further include sourcing electrical current from a battery cell or a utility grid. In some examples, the method may also include sinking current into an electrical storage cell or the grid. In some examples, the method may further include providing power to an electromagnet mounted to the rotating member.

Electrical interface assemblies for motors/generators are described, which may include a shaft of a motor-generator rotor, and a rotary electrical interface including a stationary portion rotatably coupled to a rotary portion, the rotary portion including an epicyclic member and a rotating member coupled to the shaft of the motor-generator, wherein the epicyclic member is configured to revolve around an axis of the stationary portion, the rotary electrical interface further including a first belt configured to provide a continuous rolling contact between the stationary portion and the rotary portion for electrically coupling the stationary portion to the rotary portion.

In some examples, the center axis of the rotating member may be disposed in-line with the shaft of the motor-generator rotor. In some examples, the center axis of the rotating member may be disposed parallel to the shaft, or at an angle with respect to the shaft. In some examples, the assembly may include a first rotary electrical interface and a second rotary interface, the first rotary electrical interface being configured to flow current in a first direction, and the second rotary interface being configured to flow current in a second direction different from the first direction. In some examples, the rotary electrical interface may include two or more belts, and each of the stationary portion, the rotating member, and the epicyclic member may include two or more electrically insulated channels for receiving respective of the two or more belts, such that each belt provides an independent and/or electrically insulated path from the other belts.

BRIEF DESCRIPTION OF THE DRAWINGS

The accompanying drawings, which are incorporated into and form a part of the specification, illustrate one or more embodiments of the present invention and, together with the description, serve to explain the principles of various embodiments. The drawings are only for the purpose of illustrating various embodiments, and are not to be construed as limiting. In the drawings:

FIG. 7 shows an example of a conductive belt in engagement with a rotary connector device configured for transmission of multiple signals along multiple conductive paths.

FIG. 7a shows a portion of the conductive belt of FIG. 7a illustrating alternating conductive and insulating fibers for delivering different signals over the same conductive belt.

FIG. 8a shows an example of a wire rope belt according to an embodiment of the present disclosure.

FIG. 14 shows an exemplary homopolar motor/generator module incorporating rotary electrical contact devices to transmit current to and from the rotor of the homopolar motor/generator.

DETAILED DESCRIPTION

Certain details are set forth below to provide a sufficient understanding of embodiments of the invention. However, it will be clear to one skilled in the art that embodiments of the invention may be practiced without various of these particular details. In some instances, well-known structures and materials have not been shown in detail in order to avoid unnecessarily obscuring the described embodiments of the invention.

Figure 1:
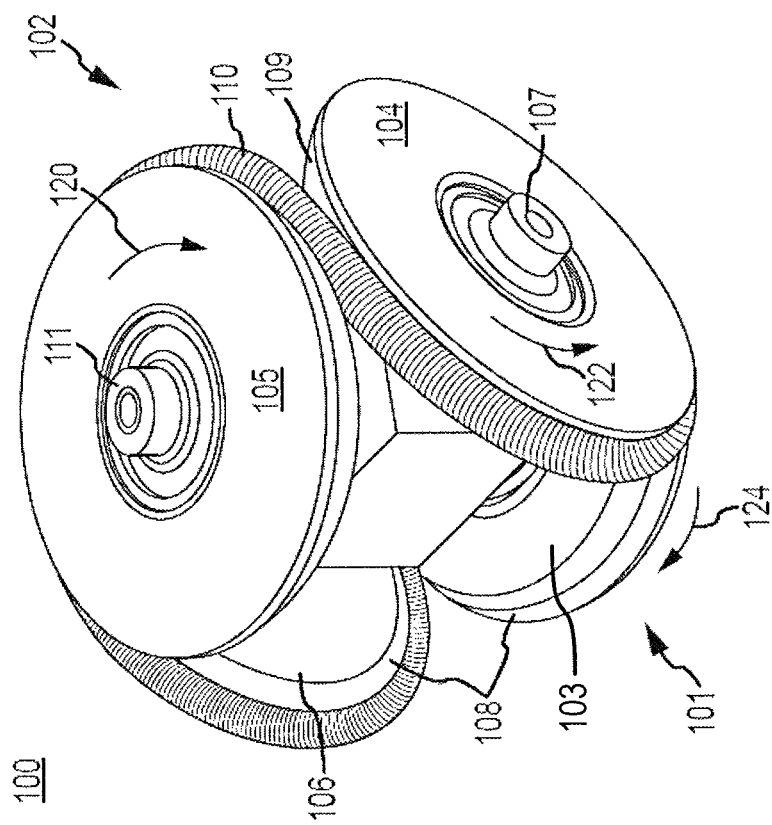
FIG. 1 shows an exemplary embodiment of a rotary electrical contact according to the present disclosure.

FIG. 1 shows an exemplary device for providing current between a stationary member and a rotating member according to embodiments of the present disclosure, which may be referred to as a "Twistact", denoting an electrical contact that can be twisted through an arbitrarily large angle without loss of electrical continuity. The device 100 may include a stationary member 101 and a rotating member 102. As will be understood, the designation of "stationary" and "rotating" member is used to convey the notion that one member (e.g. the rotating member 102) may be moving relative to another member (e.g. stationary member 101) and are not to be taken in a limiting sense to imply that the stationary member must necessarily always remain stationary relative to any reference frame. The stationary member 101 is configured to remain stationary relative to a first member or a first reference frame, such as a support structure for example. However in some examples, the first member or frame of reference may itself be moving. The rotating member 102 is configured to remain stationary relative to a second member or reference frame, which second reference frame may be moving, specifically rotating in relation to the first reference frame. In some examples, the first member and/or reference frame may also be moving or rotating at a speed and/or direction different that the speed of the second reference frame, in which case a rotary electrical contact device according to the examples described may be used to maintain the electrical contact between the first member and the second member which rotate at different angular velocities.

The stationary member may be implemented using a bottom pulley or sheave 103. The rotating member may be implemented using two side pulleys or sheaves 104, 106 and a top pulley or sheave 105. The pulleys 103-106 may have generally circular cross sections. While circular sheaves (e.g. pulleys) are shown in FIG. 1, it is to be understood that other stationary and rotating members may be used in other embodiments that provide the orbital motion described further below. The pulleys may generally be formed of any material suitable for providing the mechanical and electrical connections described herein, including but not limited to metallic conductive materials such as aluminum and copper, as examples, as well as non-metallic conductive materials, and may also incorporate coatings directed to minimize contact resistance, wear, corrosion, etc.

As depicted in FIG. 1, the top and bottom pulleys, 103 and 105 respectively, may be arranged co-axially with each other and a vertical shaft 111 may be disposed between the pulleys 103 and 105. Similarly, the pair of side pulleys 104, 106 may also be disposed coaxially and a horizontal shaft 107 may span between the pulleys 104 and 106. The vertical and horizontal shafts 111, 107 may be generally cylindrical members, which may be mounted to a center portion of the respective pulleys using a bearing or other similar rotary joint known in the art. The shafts 107 and 111 rotatably couple the sheaves or pulleys in that they maintain the relative positioning of the pulleys and overall configuration of the device. Generally, each pulley 103-106 may have its own independent bearing assembly at the interface with the respective portion of shafts 107 and 111, such that each pulley may be free to rotate independently of the other pulleys in the absence of a belt connecting the pulleys. In this manner the pair of shafts may serve to align and rotatably couple the respective pulleys. In some examples, the shafts may extend through the thickness of the pulleys as shown in FIG. 1, or the shaft may terminate at the bearing or rotary joint which couples the shaft to the pulley. The shafts 111, 107 may generally be implemented using materials suitable for providing the mechanical coupling between the pulleys 103-106. In some examples, the shafts 111, 107, may be electrically insulating so as to not provide a current path along the shafts 111, 107. In some examples, the shafts may be implemented using insulating materials including, but not limited to plastic, ceramic, or composite materials. In some examples, an insulating layer or spacer may be provided at the interface between the pulleys and shafts. In some examples, the pulleys may be composite structures with portions about the perimeter being conductive, while portions near the center being insulating. Other arrangements for confining electrical conductivity along desired portions of the pulley assembly will be appreciated in light of the present disclosure.

As shown in the example in FIG. 1, the pulleys 103-106 may have substantially equal diameters. Accordingly, the pairs of pulleys may be equally spaced apart and the device 100 may take on a generally square cross sectional profile. For example, a distance between the pulleys 104 and 106 may be generally equal to a distance between the pulleys 103 and 105. In some examples, however, the pulleys may have different diameters. Examples in which the pulleys vary in size may be implemented using shafts of different lengths and arranging adjacent pulleys at angles other than the 90 degree angle depicted in FIG. 1. For example, in FIG. 1 the pulley 104 is oriented in a direction 90 degrees from the orientation of the pulley 105. In some examples, the pulleys 106 and 104 may be tilted such that they are disposed at an angle different than 90 degrees with respect to the pulley 105. As will be appreciated, devices having non-rectangular cross sectional configurations may be possible. In some examples, the top pulley may be larger, for example 1.5-2 times larger than the bottom pulley, and the side pulleys may form an acute angle with the top pulley and an obtuse angle with the bottom pulley, thus describing a generally conically shaped device (not shown). Such a configuration may be driven by design space limitations. The angle at which the shafts 111, 107 intersect may also vary, as will be described further below. A configuration in which the shafts intersect at a non 90 degree angle may result in arrangements in which the device takes on a generally rhomboid cross sectional profile. As can be appreciated, such varying configurations may advantageously accommodate various requirements relating to the particular application and design space. As will be understood, the use of the terms "top" or "bottom" are used for ease of describing relative positions of the components of device 100 and are not to be taken in a limiting sense.

In examples described, each pulley 103-106 may include a peripheral region 108, which may be partially beveled to allow the side pulley to be angled at a 90 degree angle with respect to each other. As described, the pulleys may be fixedly arranged in the desired configuration using the intersecting shafts 111 and 107 (e.g. the shafts may serve to maintain the overall shape of the device and transmit mechanical loads). Accordingly, the surfaces defined by the beveled edges need not provide any additional engagement between the pulleys and therefore, need not be in contact with each other. However, as will be appreciated, in some examples, further engagement between each adjacent pulley may be provided by way of a surface contact, or by use of gear teeth disposed on the adjacent beveled surfaces 108 (as will be described below with respect to some of the included figures).

The device 100 may also include a belt 110, which may be disposed in a serpentine path about the perimeters of the pulleys 103-106. The belt 110 may be disposed about and configured to move along respective perimeters of the pulleys 103-106 such that it maintains a continuous rolling contact between the pulleys. Each pulley 103-106 may include a continuous groove 109 along its peripheral region 108 for receiving the belt 110. As will be understood, during operation, the belt remains seated in the groove (e.g. in engagement with the perimeter edges of each pulley) as it rolls along the path defined by the grooves 109. In this manner, and as will be described further, the belt may be used to maintain a substantially slip free rolling contact at multiple points along the perimeters of the sheaves or pulleys 103-106. As will be appreciated, nearly the full length of the belt may remain in contact with the pulleys at all times thereby providing electrical contact between the pulleys along the length of the belt in contact with the pulleys. This arrangement stands in contrast to rotary electrical contacts in the prior art based on various types of roller bearing arrangements, wherein the area of contact is extremely limited (e.g. approximates point contact or line contact), thereby implying very high electrical contact current density. Even in the case of deformable rolling contacts, such as thin-willed cylindrical rollers, the amount of contact area that can typically be achieved may still be very limited, and structures such as thin-walled cylinders may not be adapted to handling high current (e.g. compared to a 20-mm-diameter copper cable). Thus having contact along an extended length of a belt, as compared to conventional slip rings and brushes, may drastically increase the current carrying capacity of the assembly, and may offer further advantages that will be appreciated by those skilled in the art and further described below.

As will be understood, rolling motion generally involves rotation and translation with respect to a surface, in contrast to slip contact, which typically involves translating an object in contact with a given surface by sliding the object over the surface. In the case of rolling motion, providing the rolling object with rotational speed which is substantially equal to the translational speed may allow for a substantially slip-free (or no slip) contact. In the present examples, by virtue of the shafts, coupling and transmitting rotation to the plurality of pulleys at the desired rotational speed may be used to ensure a virtually slip-free condition as the belt rolls along respective surfaces of the pulleys. As mentioned previously, sliding mechanical contact may be very detrimental to brushes/slip-ring devices commonly used in the art for transmitting current to rotating objects. According to examples of the present disclosure, the generally circular belt disposed between the edges of pulleys 103-106 may be used to provide the desired rolling and translational motion for maintaining the continuous rolling contact. While a variety of advantages that may be conferred by example assemblies according to the present invention are described herein, it is to be understood that the advantages are provided by way of example and illustration only, and not all embodiments may exhibit all, or even any, of the described advantages.

During operation of the assembly 100 shown in FIG. 1, the pulley 103 may be stationary. The pulley 105 may rotate around the shaft as indicated by the arrow 120 (the opposite direction may also be used). The pulley 103 may be coupled to stationary components of a system (e.g. a support structure or an enclosure of the system). The pulley 105 may be coupled to rotating components of a system (e.g. a shaft of motor or generator). As previously described, in some examples pulley 103 may be coupled to a first rotating member and pulley 105 may be coupled to a second rotating member, wherein the first and second rotating members rotate at different speeds and/or different directions. As the pulley 105 rotates in the direction shown by the arrow 120, the pulley 104 may rotate in the direction shown by the arrow 122 about the shaft 107. The pulley 104 may also orbit the pulley 103, rolling about the perimeter of the pulley 103 (e.g. about the shaft 111) generally in the direction shown by the arrow 124. The pulley 106 may also rotate around the shaft 107 in an opposite direction as the pulley 104, but orbit the pulley 103 in the same direction as the pulley 104 and orbit in an analogous manner to the pulley 104. The belt 110 may roll in a direction shown by arrow 126. For example, a portion of the belt may be in contact with a perimeter of the pulley 104. The portion of the belt may not slide along the pulley 104, but rather may rotate with the pulley 104 until it comes into contact with the pulley 103. The belt may be implemented using one or more conductive elements, examples of which will be described further below. In this manner, the assembly of FIG. 1 may include a first electrical path from the pulley 103 to the pulley 105 through a portion of the belt 110 in contact with the pulley 103 and the pulley 104, through the pulley 104, and through another portion of the belt 110 in contact with the pulley 104 and the pulley 105. The assembly of FIG. 1 may include a second electrical path from the pulley 103 to the pulley 105 through a portion of the belt 110 in contact with the pulley 103 and the pulley 106, through the pulley 106, and through a portion of the belt in contact with the pulley 106 and the pulley 105.

Figure 2:
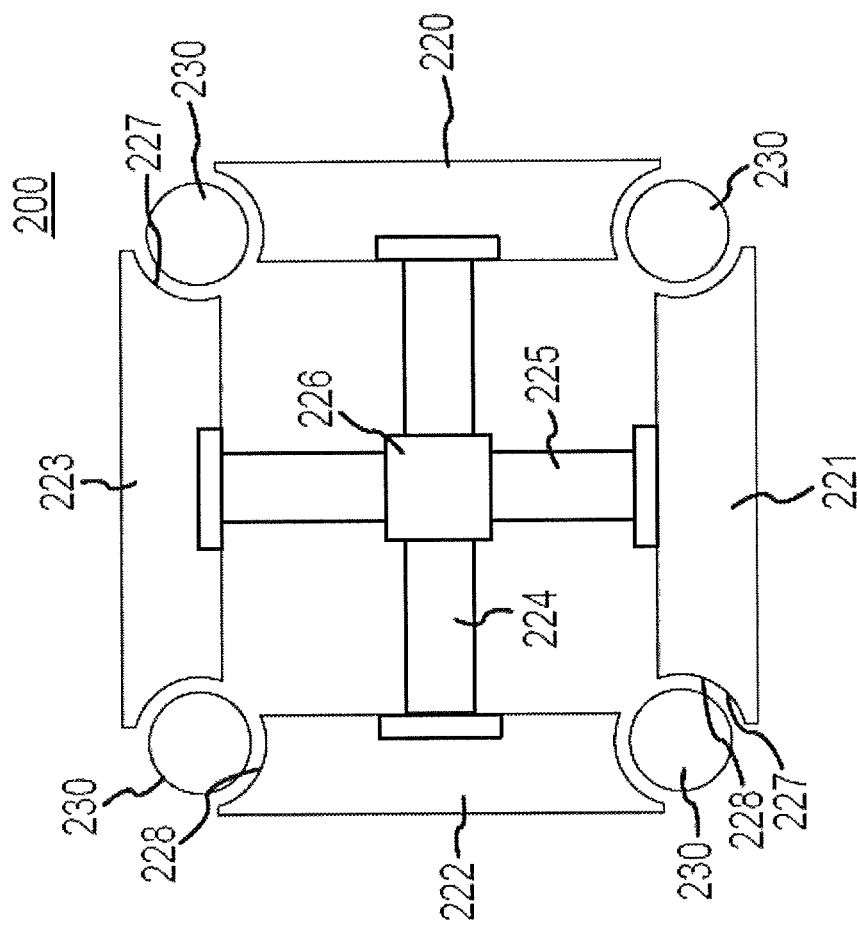
FIG. 2 shows a cross-sectional diagram of an example rotary electrical contact according to the present disclosure.

FIG. 2 shows a cross-sectional diagram of an example rotary electrical contact device according to the present disclosure. The device 200 shown in FIG. 2 has a generally square cross-section similar to the device 100 previously described. The device 200 includes four sheaves (e.g. pulleys) 220-223 defining the four walls of the generally square device 200, and two shafts 224 and 225 connecting each pair of sheaves and intersecting at intersection point 226. Each of the sheaves 220-224 may include a channel or groove 228 defined at respective edges of the sheaves. The channels or grooves 228 may be semi-circular in shape for receiving the contact member 230, which may be a conductive belt, as described herein. The contact member 230, which is for illustration purposes is shown slightly spaced apart from the surface 227 of channel 228, in certain embodiments may in fact be in contact with the surface 227 during operation of the device. As can be appreciated, at any given time, multiple surfaces of the contact member (e.g. belt) 230 are in contact with the surfaces 227 of channels 228 thereby providing an uninterrupted path for transmission of electrical current. Through this continuous rolling contact over a large area of contact, current may be delivered at higher capacities than previously possible while minimizing frictional wear of the coupling device 200. In this example, and other examples described herein, the shafts 224 and 225 may be a unitary structure, in that they may be fabricated as a single monolithic part by any methods known in the art. As previously described the pair of shafts may be used to maintain the overall geometry of the rotary electrical contact device. Each end of the two shafts 224 and 225 connects to each one of the pulleys or sheaves 220-223 using a low friction revolute joint, for example a roller bearing or other such mechanisms known in the art to provide low friction rotary coupling.

Referring back to FIG. 1, the belt 110 may be made of an electrically conductive material, or may be formed from a plurality of segments, at least some of which may be made of a conductive material. In examples, and as will be further described, the belt may be made of virtually any conductive material, including metallic materials, for example, but not limited to, copper. Many configurations are possible for achieving the desired flexibility in the transverse directions, such that the belt can loop around and traverse the continuous closed path about the perimeters of pulleys 103-106. In some examples, the contact member (e.g., belt) 110 may be flexible along its longitudinal direction allowing the belt 110 to stretch a small amount, for example less than about 25% elongation. In some examples, the belt 110 may be relatively stiff or inelastic along the longitudinal direction.

During operation of the device 100, one of the pulleys, for example the bottom pulley 103, may remain stationary, while the other three pulleys execute a combination of rotation and revolution about the center of the bottom pulley 103. For the purposes of illustration, and referring to the example in FIG. 1, during operation the top pulley 105 may be mechanically coupled to a rotating component, such as the shaft of a rotor in a motor or generator, for example. The top pulley 105 may accordingly rotate synchronously with the rotation of the rotor shaft. The rotation of the top pulley 105 may be transmitted to the belt 110 to cause the side pulleys (e.g. orbital pulleys) to revolve about the axis of the vertical shaft 111. As previously described, nominally frictionless revolute joints (e.g. bearings) may be located at the interfaces between the shafts and the pulleys de-coupling the rotation of each pulley. In some examples, as may be suitable for the particular application, bearing assemblies may be selectively provided at certain shaft-pulley interfaces and not at others so as to couple or de-couple the rotation of the pulleys, if desired.

Furthermore, the side pulleys 104 may be rotatably coupled to the horizontal shaft 107 using conventional bearings or other devices configured to provide the side pulleys with rotational freedom. The side pulleys 104, 106 would therefore rotate while revolving, and thus forcing the belt 110 into a continuous rolling contact with the groove in the perimeter of the bottom pulley 103. Returning to the example of coupling the device 100 to a rotor of a motor/generator, it will be appreciated that while the top pulley is mounted to and rotates with the rotor, the bottom pulley may remain stationary, or may rotate at a different speed and/or direction. Furthermore, because there is continuous contact between at least one surface of the belt 110 with respective surfaces of the top, side and bottom pulleys, a continuous path for conducting electricity may be provided, as described herein.

Figure 3:
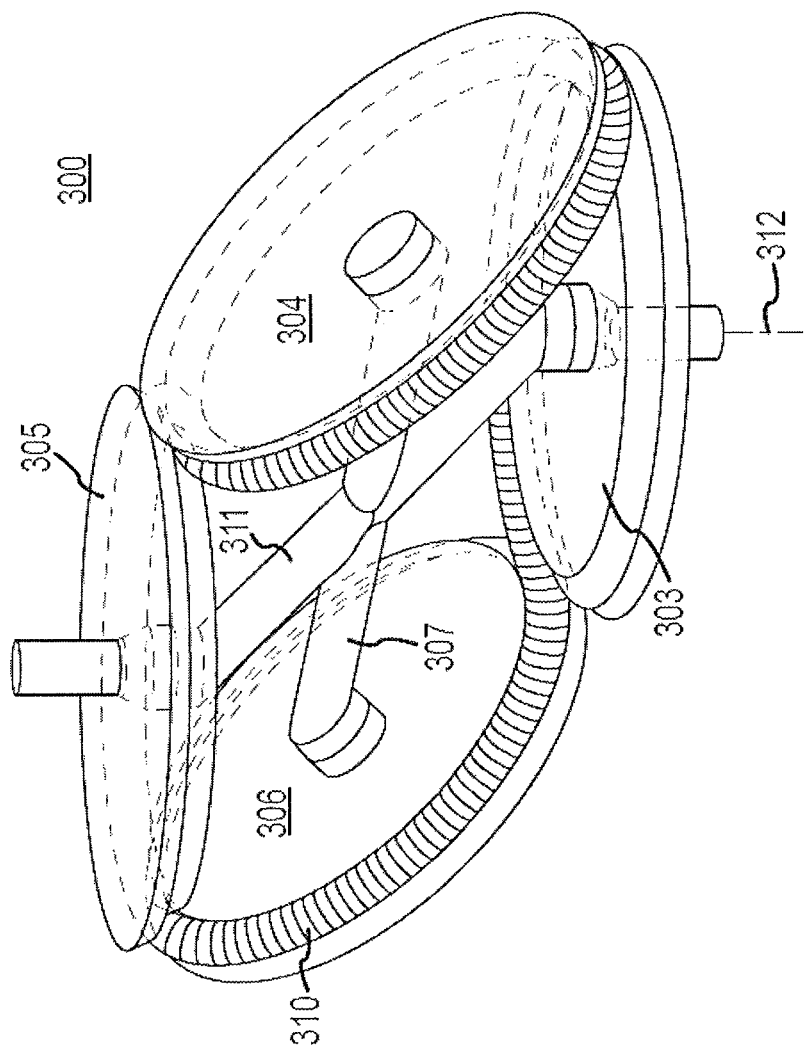
FIG. 3 shows an example of a rotary electrical contact according to the present disclosure, in which the top sheave is configured to revolve about the axis of the bottom sheave.

FIG. 3 shows an illustration of a rotary electrical contact device according to another embodiment of the present disclosure. Similar to the device 100 described above, the electrical contact device 300 may include a first pair of opposing and spaced apart sheaves or pulleys 303 and 305 (e.g., analogous to pulleys 103 and 105 previously described), and a second pair of opposing and spaced apart sheaves or pulleys 304 and 306 (e.g., analogous to pulleys 104 and 106 of the device 100). The first pair of sheaves may be coupled together by intersecting first shaft 311, and the second pair of sheaves may be coupled together by a second shaft 307. The device 300 may also include an electrically conductive belt 310 disposed about respective perimeters of the first and second pair of sheaves, the belt 310 being configured to remain in contact with at least a portion of the respective perimeters of each sheave 303-306 during operation of the device. Counterweights or other structures (not shown) adapted to static and/or dynamic balancing of the Twistact may further be included. In many respects, the disks, shafts, and belt of device 300 may be similarly configured and function in a manner similar to those described in reference to FIG. 1, thus for the sake of brevity their description and operation will not be repeated.

Unlike the example in FIG. 1, sheaves 305 and 303 of the device 300 may be arranged such that their center axes do not align. Similarly, the side sheaves 304 and 306 may also have centers which are offset from each other. Accordingly, the shaft 311 may be tilted relative to the general transverse plane of sheaves 303 and 305. Similarly, shaft 307 may also be non-perpendicular to sheaves 304 and 306. As will be appreciated such offset between sheaves 305 and 303 may allow for additional planetary motion of sheave 305 with respect to the axis 312 of sheave 303. This may be advantageous in certain assemblies where the rotating top sheave 305 may also need to provide orbital or revolving motion about an axis, such as axis 312 for example.

Contact members (e.g. belts) according to the present disclosure may be manufactured using, at least in part, commercially available metal alloys. Materials may be selected to optimize important performance tradeoffs, such as electrical conductivity, fatigue life, mechanical wear, and age-related surface effects such as corrosion and/or coating delamination. As is known in the art, thermal conductivity is typically proportional to electrical conductivity, fatigue life typically scales with tensile strength, and wear resistance is typically proportional to hardness. Thus in general terms, suitable belts may be fabricated using alloys which provide high conductivity, high tensile strength, and high hardness. In some examples, corrosion resistance may be achieved by application of a surface coating (e.g. by electroplating or cladding) contact surfaces of the belt, and in some examples such a coating may be further selected to provide low electrical contact resistance and wear resistance. From the standpoint of electrical conductivity alone, oxygen-free high-conductivity (OFHC) copper may be a suitable choice for fabrication of an endless coil spring belt, however, OFHC copper may not perform optimally from the standpoint of mechanical fatigue and/or wear. Accordingly, a copper alloy such as phosphor bronze for example, which may be used in high performance springs, may be used for fabricating examples of the belts described because of its superior fatigue and wear properties.

In some examples, copper alloys such as chromium-based copper alloys (UNS designation C18200), zirconium-based copper alloys (C15000), cadmium-based copper alloys (C16200), beryllium-based copper alloys (C17500), iron-based copper alloys (C19200), and copper-based metal matrix composites such as Glidcop (C15725) may be used to fabricate belts according to the present disclosure. Such alloys may incorporate other trace species (e.g. phosphorus, lead, oxygen) and may be tempered, precipitation hardened, and/or work hardened to achieve optimum properties.

In one example, a commercially available high-performance alloy, Percon 28, which is an alloy of Cu, Mg, Sn, and Cr (with trace levels of phosphorus) available from Fisk Alloys of Hawthorne, N.J., may be used for fabricating the belt 110. Percon 28 may provide 85% IACS electrical conductivity, 82 ksi (550 MPa) tensile strength, and drastically improved hardness, fatigue resistance, and high-temperature strength relative to unalloyed copper. Other alloys in the Percon series developed by Fisk Alloy may also be suitable candidates. While specific examples of copper alloys have been discussed, it should be understood that any material, currently known or later developed, having a desirable combination of physical properties as described herein, could be used in part or in whole to fabricate a belt according to embodiments of the present invention.

Belts according to the present disclosure may be implemented to minimize the electrical resistance in the transverse direction and/or longitudinal direction. Fatigue lifetime of the belt may depend on the materials chosen for belt fabrication and the architecture of the belt itself. For example, in the case of a roller chain configuration, in which articulated electrically conductive circular members are provided along a central chain, the ruggedness of a chain drive may advantageously be obtained, and elastic deformation of the electrically conductive members may largely be avoided (e.g. compared to the case of a helical spring belt). Similarly, a spinal column belt configuration described further below, in which articulated electrically conductive disks, separated by flexible spacers, supported on an internal cable or other flexible core, may offer similar advantages. For both the roller chain and spinal column belt configurations, longitudinal electrical continuity may be provided in some examples by one or more internal conductors that run along the axis of the belt. In both cases, the mating geometry between the conductive disks and pulleys may be designed to maximize electrical contact and minimize wear (e.g., during engagement and disengagement with each pulley). In some examples, the channel or sheave of the pulleys may further be provided with appropriately-shaped transverse grooves for positive engagement with ribs of the belt at the belt/pulley interface (see for example structure 735 of FIG. 7).

With respect to belts based on cable or wire rope configurations, examples include various forms of electrically conductive stranded cables formed into an endless loop. In this case, the electrically conductive elements or fibers may be oriented principally along the longitudinal axis of the belt, and the magnitude of bending strain that each conductor is subjected to may be minimized by using conductors of very small diameter. Another preferred wire rope configuration may be implemented as a multilayer helical belt which can be thought of as a hybrid between the endless coil spring and an endless loop of wire rope. In this case the belt may be formed as a helical structure wherein the wound helix comprises a solid or stranded electrically conductive structure. The solid or stranded helical conductors may in turn be supported by an internal structure responsible for supporting tensile loading of the belt and/or limiting transverse displacement of the helical windings relative to the longitudinal axis of the belt. Furthermore, the finer gauge internal conductors may be further protected from surface-contact wear (e.g. breakage and/or shedding) by providing exterior electrical conductors of larger cross section. In examples, the exterior electrical conductors may be perpendicular to the belt axis, parallel to the belt axis, or anything in between. Moreover, individual strands may comprise an inner core of high electrical conductivity material surrounded by a thin outer cladding of wear resistant material that may have somewhat lower electrical conductivity. Examples of belt configurations will now be discussed in further detail with reference to FIGS. 4-8.

FIGS. 4-8 show example embodiments of contact members (e.g. belts) according to the present invention. Examples of conductive belts described herein may include various forms of endless coil spring belts as shown in FIGS. 4a and 4b, a "truncated-ball-and-socket-joint" belt as shown in FIG. 4c, a spinal column belt configuration as in FIG. 5, a roller chain belt as in FIG. 6, belts formed as a bundle of alternating electrically conductive fibers and electrically insulating fibers such as that shown in FIGS. 7-7a, and a wide variety of belt architectures based on various forms of wire-ropes (FIGS. 8a, 8b, 8c, 8d, and 8e). However, as will be appreciated in light of the present disclosure, many other configurations or form factors may be possible for a contact member used to couple a stationary to a rotating member in accordance with examples of the present invention.

Figure 4A:
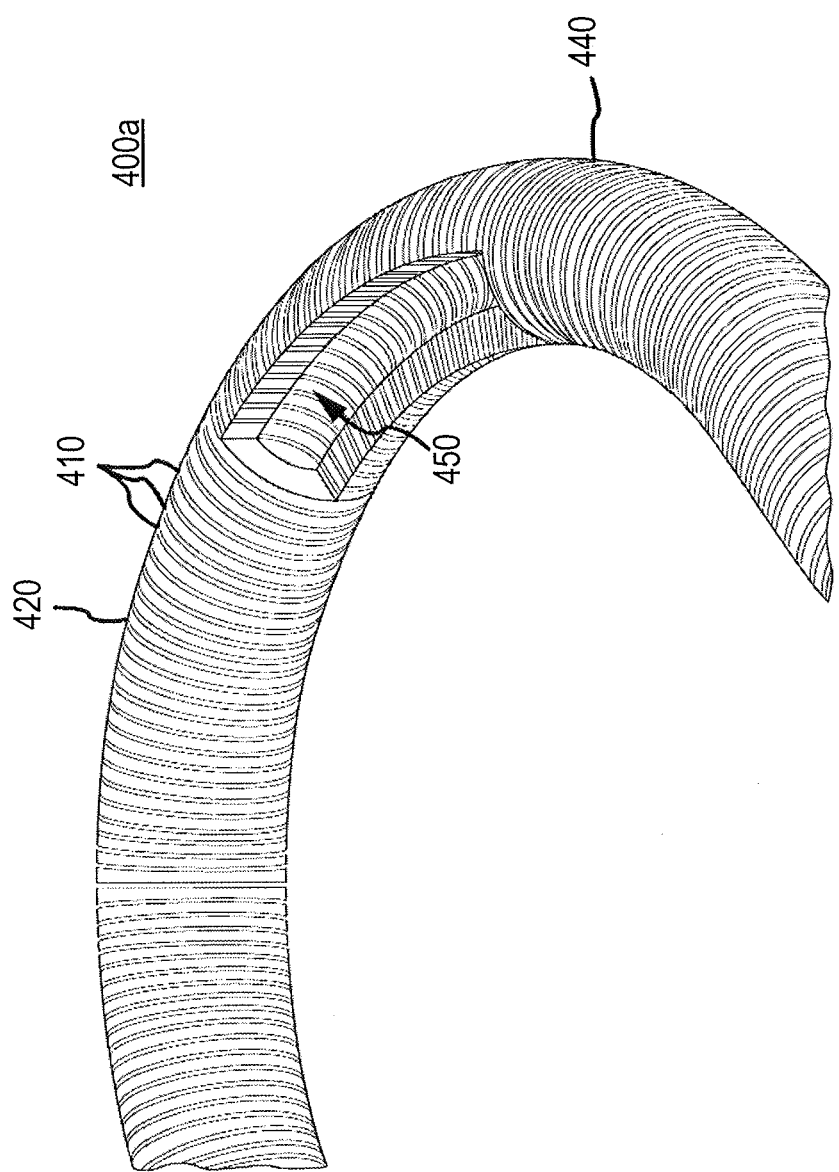
FIG. 4a shows an example of an endless coil spring configuration of a belt according to the present disclosure.
Figure 4B:
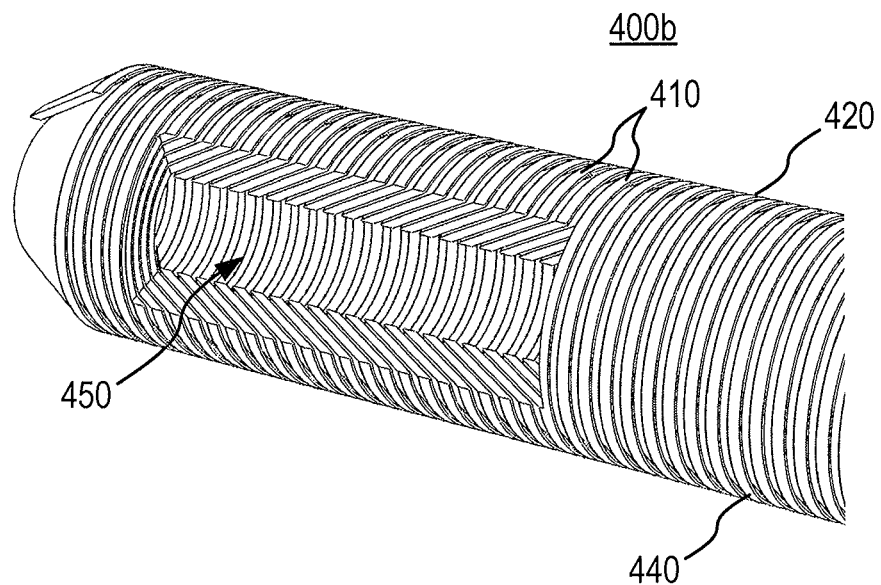
FIG. 4b shows another example of a coil spring belt made from a wire with a cross-sectional shape of a parallelogram.

In the example in FIG. 4a, the belt 400a may include a plurality of windings 410, each winding having an outermost contact surface 420 which is electrically conductive. The windings may be implemented according to any number of form factors, some of which are described herein. The example belt 400a of FIG. 4a is a helical coil spring belt, which may be formed as an endless loop (e.g., a continuous closed loop) by connecting a first end of the coil spring to the other end of the coil spring. A helical coil spring 440 may be formed from a continuous metal wire, such as copper for example, which may be twisted about a hollow center portion 450. One advantage of such a configuration may be the relative ease of fabrication. A single strand of conductive material may be used, as described, the ends of which may be joined by conventional methods. In some examples, cold pressure welding or ultrasonic welding may be used, which can offer a high quality weld without altering the temper and/or other metallurgical properties of the material at the joint region. This may be advantageous for achieving a joint region having fatigue resistance substantially equal to that of the parent material. In some examples, a post-weld tempering and/or other treatment processes may be undertaken if necessary to assure that the material properties and/or geometry of the joint region are not inferior relative the remainder of the belt.

The pitch of helical spring belt 400a of FIG. 4a may be made small enough that adjacent windings 410 come into contact when the belt is bent over the sheave. Such an effect may be used to enhance the electrical conductivity of the belt in the longitudinal direction. Such an effect may be further enhanced by using a helical spring belt 400b of a different form, such as that shown in FIG. 4b. In this example the belt is wound from a length of wire whose cross-sectional shape is a parallelogram. Such variants on the basic helical belt of FIG. 4a may also be adapted to provide improved flexibility and/or fatigue resistance. Alternatively, a belt such as that shown in FIG. 4a may be designed with a pitch large enough to prevent contact of adjacent windings when bent over the sheave (e.g. to avoid mechanical wear).

Additional variations of helical spring belts include multi-layer spring belts comprising two or more springs, wherein the left-handed windings, right-handed windings, or a combination thereof may be employed. Helical spring belts may also be fabricated as a composite structure in which an outer helix of high electrical conductivity material, which may not be suitable for use as a standalone spring (e.g. OFHC copper), is supported by an internal extension spring whose primary function is structural rather than electrical. In some helical belt structures the spring wire itself may also comprise a composite structure, for example, a fatigue resistant core material such as AISI 6150 chrome-vanadium spring steel that is over clad with a high conductivity copper alloy.

Figure 4C:
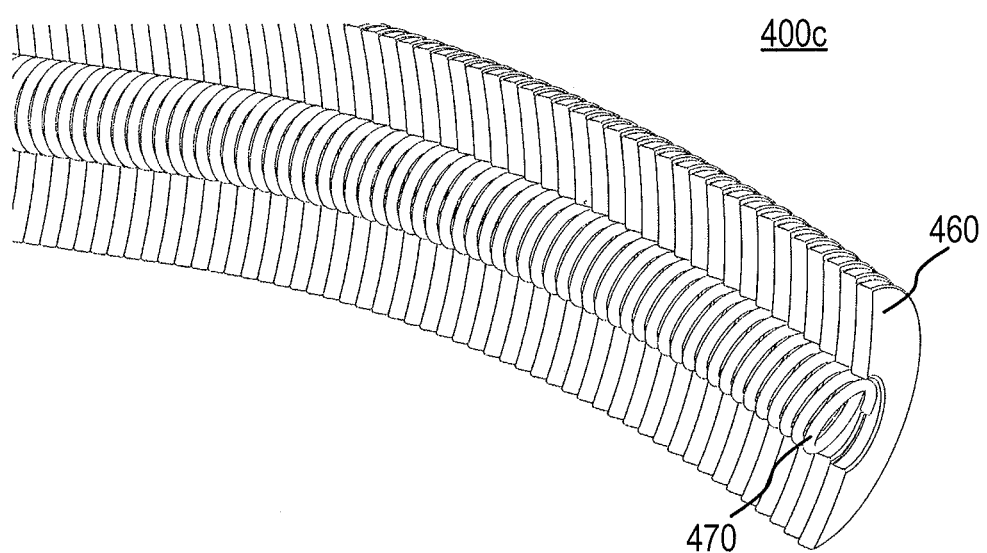
FIG. 4c shows an example of a truncated ball and socket configuration of a belt according to the present disclosure.

FIG. 4c shows a variant of the spinal cord belt, the "truncated-ball-and-socket-joint" belt 400c, in which each electrically conductive annular disk 460 may be concave on one side, and convex on the other side, such that successive disks may be tightly stacked together in the longitudinal direction, even as the belt negotiates the curved trajectory of the sheaves. The array of annular concave/convex disks 460 are supported in the transverse direction, and compressed together in the longitudinal direction, by a flexible core 470, for example a taut internal extension spring that is joined into the form of an endless loop. Each pair of adjacent concave/convex disks function like the mechanical interface found in a ball and socket joint. Rather than being separated by spacers, successive disks are kept in spring loaded mechanical contact, thereby providing for longitudinal conductivity. As with the spinal cord belt, the articulation rather than elastic deformation (bending) of the electrically conductive members may greatly reduce concerns about fatigue. It will be noted that while in some examples of a "truncated-ball-and-socket-joint" belt, as shown in FIG. 4c, the flexible core 470 may be a spring belt, in other examples the flexible core 470 may comprise other non-spring-like structures, of key importance being the geometry and disposition of the outer current carrying concave/convex disks. In some embodiments the mating geometry between adjacent outer current carrying disks may be adapted to provide spring loading between adjacent disks (e.g. current carrying disks having slightly different concave and convex radii of curvature).

Figures 5, 5A:
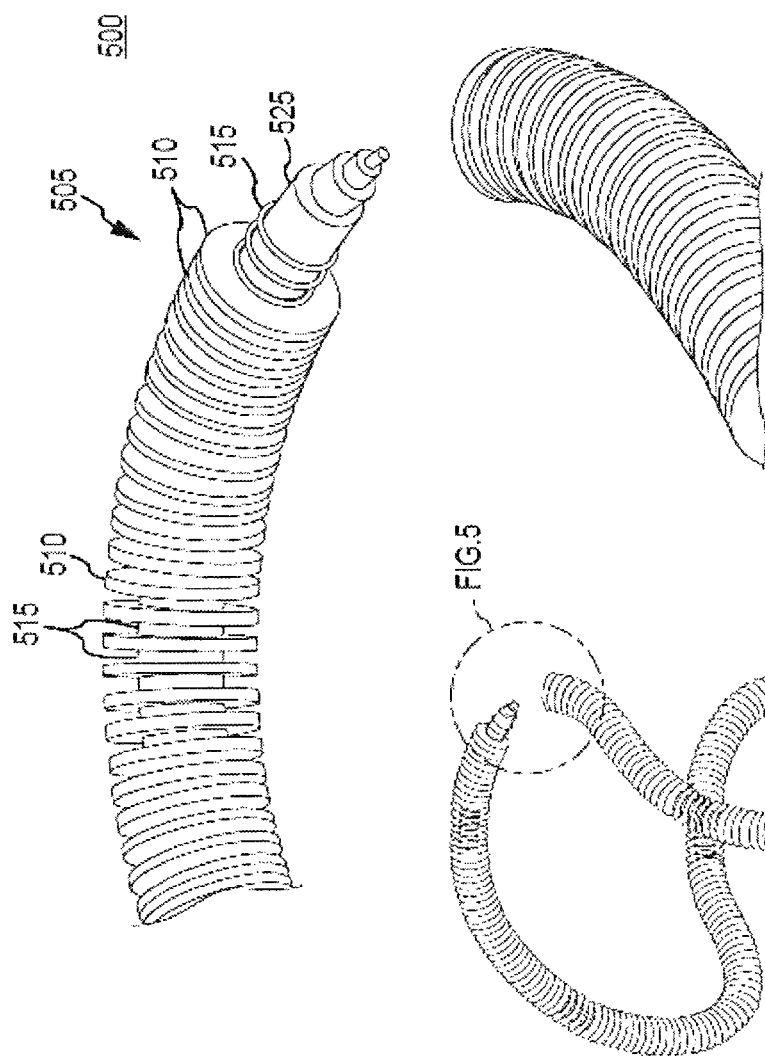
FIG. 5 shows an example of a spinal cord configuration of belt according to the present disclosure.
FIG. 5a shows an illustration of an exemplary shape of the belt of FIG. 5, when the belt is placed in engagement with electrical coupling devices according to the present disclosure.

FIG. 5a shows another example of a conductive belt which may be used with the electrical coupling devices described herein. The belt 500 may be implemented as an alternating array 505 of a plurality of conductive disks 510 spaced apart by a plurality of mechanically compliant spacers 515. The conductive disks 510 may be made of virtually any electrically conductive material, for example a metal such as copper or a suitable alloy. The disks 510 may be arranged adjacent to one another such that they coaxially aligned with each other. The flexible spacers 515 may be implemented as insulating rings, such as polymer rings, wave springs, rubber washers, etc. and may be inserted between each disk 510. The array of conductive disks and flexible spacers may be threaded over an internal flexible core 525 which may be joined at each end to form a closed loop. As will be appreciated, the presence of the spacer 515 may provide not only flexibility between each rib of the conductive belt, but may in some cases also insulate each of the conductive disks from each other. For illustration purposes, inset FIG. 5a shows an exemplary shape that the conductive belt 500 may adapt when disposed in engagement with the pulleys 103-106 of the device 100 in FIG. 1. As can be appreciated, the arrangement of alternating disks 510 and flexible spacers 515 may provide the flexibility needed for the belt to follow the complex path about the periphery of the device as shown in inset 5a.

In some examples, dimensions and/or materials for the spacers may be selected to obtain a desired level of compliance, such that the disks 510 may be insulated from adjacent disks even when the belt 500 is bent to a curved or arched configuration. In other examples, it may be desirable to have electrical contact between successive disks 510 when the belt is bent to the radius of curvature of the sheave. As can be further appreciated, in examples in which the disks are generally separated and thus insulated from each other, independent signals may be transmitted along predefined conductive paths, as will be further described herein.

Figure 6:
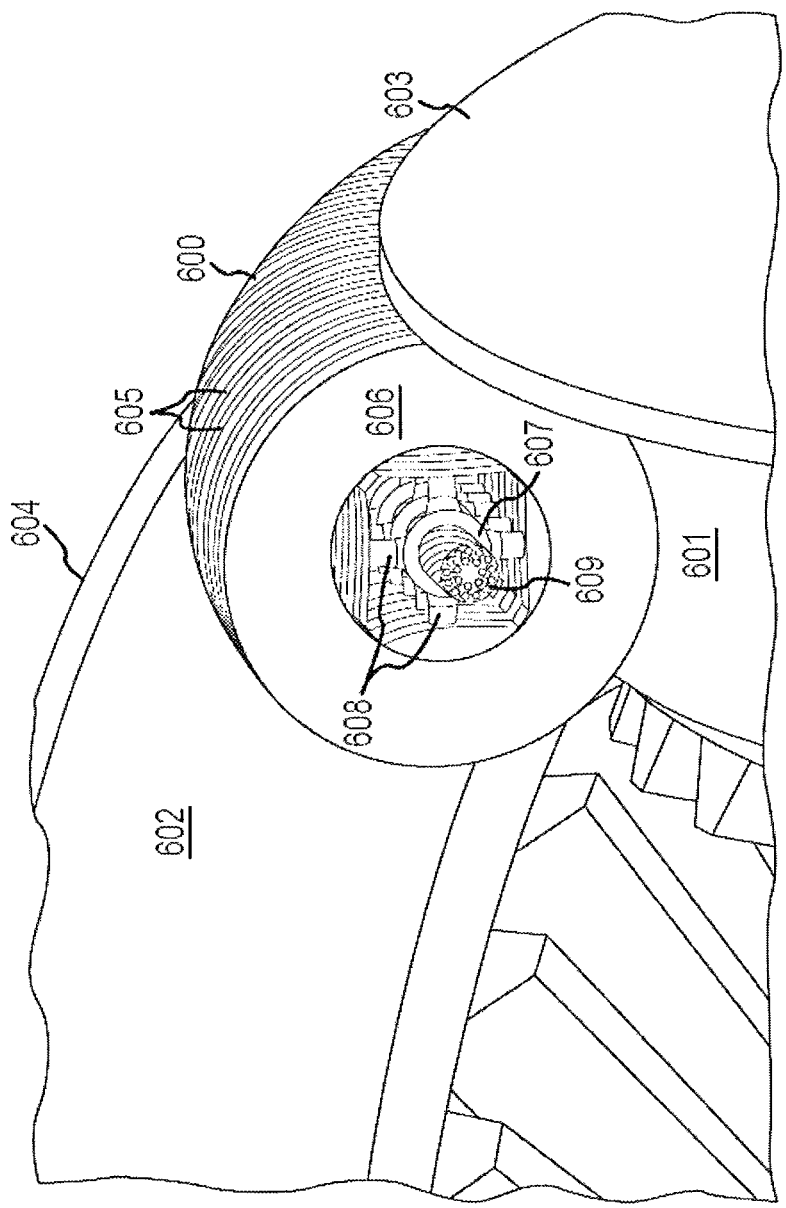
FIG. 6 shows a cross section of a roller chain configuration of an example belt according to the present disclosure.

FIG. 6 shows a conductive belt according to another embodiment of the present disclosure. A transverse cross-section of belt 600 is shown, a portion of the belt being depicted in engagement with the contact surfaces 601 and 602 of two adjacent sheaves 603 and 604 of a rotary electrical contact device as described herein. Similar to other embodiments, the belt 600 may be generally flexible in the transverse direction (e.g. the belt is able to bend relative to its longitudinal axis). In some examples, the belt may also be flexible along its longitudinal axis (e.g., as in the helical coil spring configuration), however, such flexibility is not strictly necessary for operation of the device. The level of flexibility inherent in the materials and the particular belt design may provide all of the needed longitudinal flexibility to allow the belt to remain in engagement (e.g. under the tension of the side sheaves) during the operation of the rotary electrical contact device, or in the case of an inelastic belt, one or more tensioning mechanisms may be incorporated elsewhere. Such a tensioning or a spring loaded mechanism can be incorporated into the assembly of FIG. 2 according to a variety of techniques known in the art to configure such a mechanism to exert a force that acts to alter the position, angle, and/or diameter of one or more pulleys in a manner that increases the total path length the belt must travel to complete round trip around the sheaves.

The belt 600 depicted in FIG. 6, may be implemented in a manner similar to the belt 500, in that it may include a plurality of flat circular members 605 similar to the annular disks 510. The flat circular members 605 may have cutouts of various shapes and sizes. In some examples, each flat circular member 605 may have an outer annular portion 606 and an inner annular portion 607, each of the outer and inner annular portions connected by a pair of arms 608. The pair of arms 608 may be disposed at generally opposing locations connecting the inner and outer annular portions 606 and 607 along an imaginary diameter of member 605. Such a configuration may provide flexural rigidity along one direction while providing flexibility along a perpendicular direction.

A plurality of the flat circular members 605 may then be arranged and chained together along an elongated central portion 609, which may be a wire rope or cable, for example. Each of the flat circular members 605 may be rigidly attached to the central portion 609, or they may be pivotally attached through a type of a ball and socket joint. In some examples, the central portion 609 may be made of an electrically conductive material. In some examples, the flexible core (e.g. elongated central portion) 609 may be insulating, and in examples additional spacers may be provided between respective inner annular portions 608 of the flat circular members 605.

Adjacent flat circular members 605 may have alternating orientations in that a first flat circular member may have its arms pointing at twelve and six o'clock while an adjacent flat circular member may have its arms pointing at 9 and 3 o'clock. Alternating the directions of the arms of each respective circular member may allow the belt to bend in both transverse directions, and/or may otherwise allow for tailoring of the structural characteristics and performance of the belt. As will be appreciated, this 90 degree offset orientation may be modified in that the arms of each consecutive member 605 may be aligned to point at virtually any direction. The orientation pattern may be repeated along the longitudinal axis to form the roller chain belt design shown in FIG. 6. Such a roller chain belt may further be used in conjunction with sheaves having transverse grooves or other features adapted to positive mechanical engagement.

FIGS. 7 and 8 show examples of conductive belts implemented in the form of wire ropes (e.g. cables) or structures sharing some of the attributes of wire ropes. As previously described, a conductive rope may be formed by bundling a plurality of conductive fibers together. However, such configurations may not offer sufficient flexibility or durability. Conductive cables formed by twisting, braiding, or otherwise intertwining the conductive fibers together may offer additional performance improvements.

Referring now to FIG. 7, in some examples, the belt 110 may be an electrically conductive cable 700 which may be formed from a bundle of elongated electrical conductors 705. Each elongated electrical conductor 705 may be an individual wire made of a desired conductive material, such as copper, or each elongated conductor 705 may itself be formed as plurality of electrically conductive fibers (e.g. a strand of wires), as described herein. The strands may be insulated from one another. The particular material and/or diameter of each strand may be selected to obtain the desired performance specifications (e.g. for maximum current handling and/or maximum dielectric strength), and the structural/durability characteristics of the conductor belt desired for a particular application. The individual strands or wires may be formed into a conductive rope by any techniques known in the art, such as twisting, braiding, weaving, preforming or otherwise intertwining the strands together. In some examples, the belt may be formed as a bundle of alternating electrically conductive fibers and electrically insulating fibers. That is, non-conductive strands 710 may be included in the bundle 705 if desired, to electrically isolate one or more conductors and/or to provide additional flexibility and/or durability, for example. Twisting or braiding the individual strands into a cable 700 may help to retain the overall shape of the conductor belt as well as provide additional flexibility and durability, as compared to using a single thicker conductor, which can be overly rigid, or a rope of generally longitudinally-arranged wires, which may be prone to breakage or shedding of individual fibers and/or unequal tensile loading of fibers.

The cable 700 is shown in engagement with the contact surfaces 720 of the respective top and side pulleys 725 and 730. In some examples, at least one of the alternating electrically conductive fibers, such as individual fiber 740, may be configured to couple a signal between a first predetermined location 735 on the surface 720 of pulley 725 and a second predetermined location on the second surface of pulley 730 (not shown, as it is covered by the cable 700 in this view). For example, such a configuration may be obtained by insulating each or some of the electrical conductors from one another, or interspersing non-conductive strands 710 between some or all of the conductive strands 705, as mentioned above. As will be appreciated, such an arrangement may allow for independent use of each conductive path formed by each strand when it contacts the surface 720 of the respective pulley 725, 730, provided that successive pulley grooves such as 735 are also electrically isolated from each other. In such an embodiment a pulley such as 725 may be assembled from a plurality of alternating electrically conductive and electrically insulating components. Insulating channels may also be implemented using a subtractive machining process such as wire EDM. Alternatively such a pulley may be fabricated as single monolithic part compromising an electrically insulating material, wherein the insertion of via wires and selective electroplating of grooves such as 725 provide the desired functionality. These signal conductors may converge radially near the center of the pulley, for example, wherein the plurality of converging conductive members may be soldered to or otherwise interfaced to an attached electrical connector. In this manner, a plurality of signals of different values may be passed to and from the rotating structure using the same coupling device.

Figure 8B:
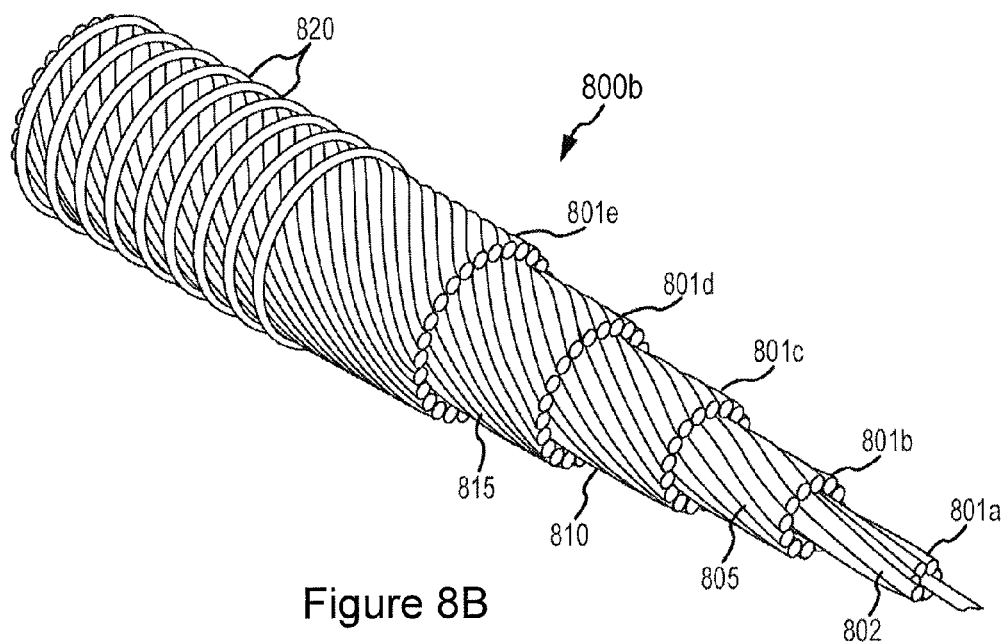
FIG. 8b shows a portion of an example of a protected wire rope configuration of a belt according to the present disclosure.
Figure 8C:
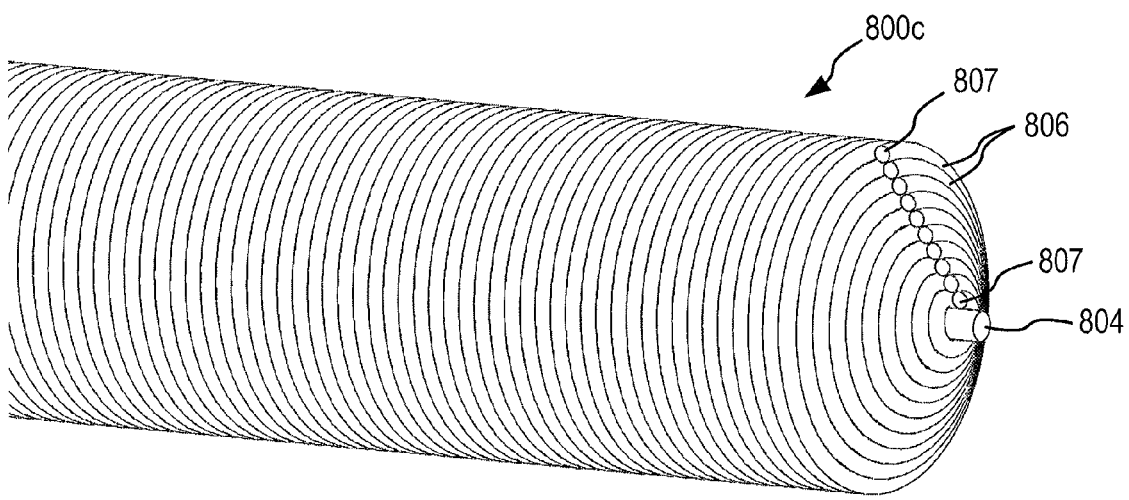
FIG. 8c shows an example single-start multi-layer helical belt configuration.
Figure 8D:
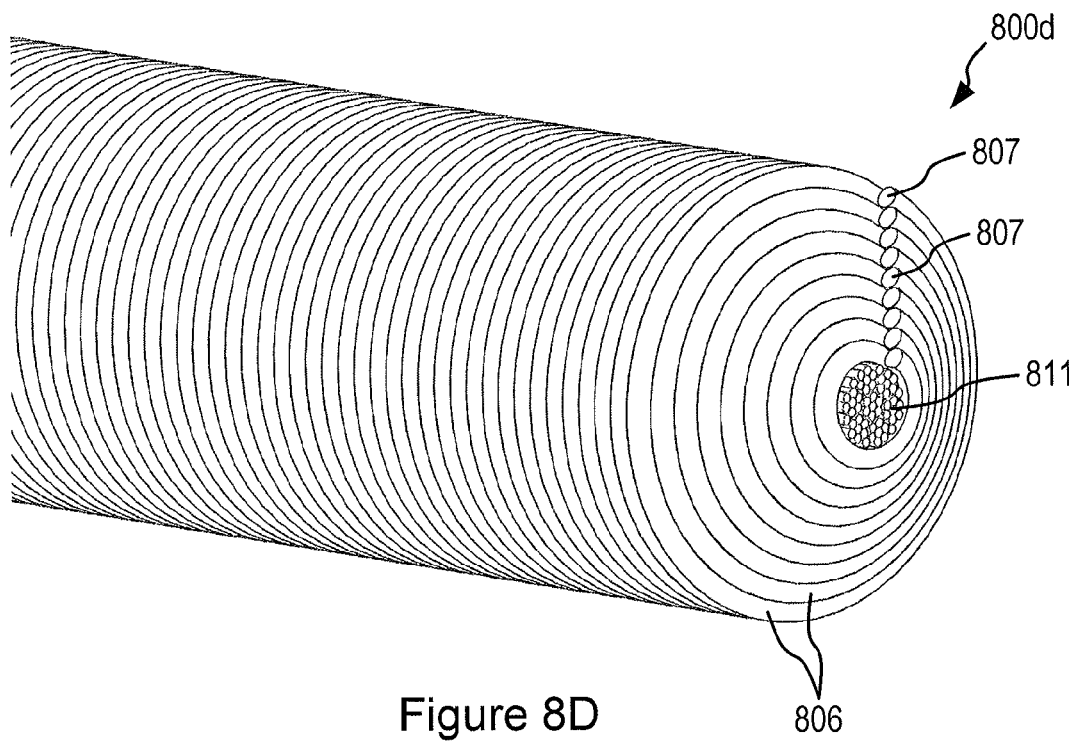
FIG. 8d shows another example of a single-start multi-layer helical belt having a stranded core.
Figure 8E:
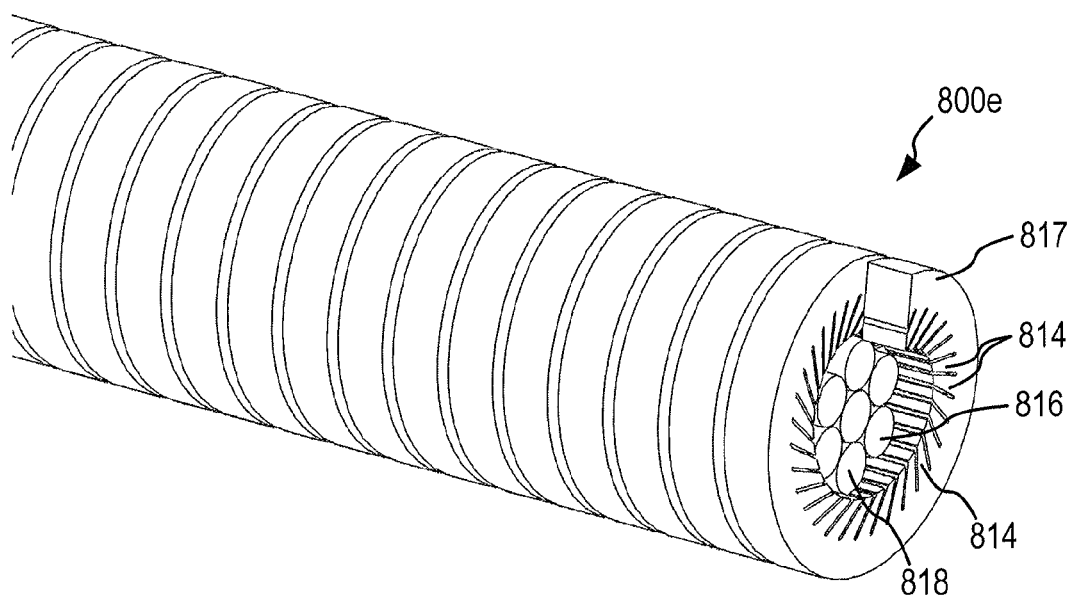
FIG. 8e shows another example of a belt configured as a hybrid of a single-layer helical belt and a wire-rope.

FIGS. 8a, 8b, 8c, 8d, and 8e illustrate a variety of structures incorporating or related to wire ropes, adapted to function as a single electrical conductor rather a plurality of electrically isolated conductors (e.g. for applications involving transmission of high electrical current). The electrically conductive belt 800a of FIG. 8a, referred to as the "wire rope belt" comprises an endless loop of wire rope 803. FIG. 8b shows a portion of a variant of such a structure (e.g. belt 800b) referred to as the "protected wire rope belt". The protected wire rope belt incorporates one or more external structures 820 adapted to protect the outer strands of the wire rope from mechanical wear, wherein such external structures are adapted to not substantially reduce the flexibility of the underlying wire rope. FIG. 8c illustrates the "multi-layer helical" belt 800c, wherein a central supporting core 804 is surrounded by one or more layers of helically wrapped wires, strands, and/or cables 806. Such helical windings 807, which are wound nearly perpendicular to the longitudinal axis of the belt, may be adapted to provide extremely high flexibility and/or low fatigue. The embodiment shown in FIG. 8c depicts a single-start helix, wherein each layer of the belt comprises a single conductor 807 that spirals around the core 804 of the belt in a helical trajectory over the entire circumference of the belt. Alternatively multi-start helical windings such as those used in some flexible drive shafts may be used. FIG. 8d illustrates a refinement of the multi-layer helical belt 800d, referred to herein as a "multi-layer helical stranded core" belt. FIG. 8e illustrates an embodiment that may be considered a hybrid of a single-layer helical belt and a wire-rope. Once again the core 811 of the belt 800d comprises wire rope or cable, which may be implemented according to any of the examples described.

In some examples, compliant structures 814 (e.g. flexible "fingers") may be provided at the interface of the belt's core 816 and the windings 817. In examples, the purpose of the flexible "fingers" (see FIG. 8e) may be to create a mechanically compliant spring loaded electrical connection between the outer helical coil 817 and the inner wire rope core 816 that allows the two structures to move relative to each other without the need for sliding contact (so as to minimize or avoid internal mechanical wear); as will be appreciated, small amplitude cyclic relative motion of these two structures occurs during bending and unbending of the belt 800e.

Variations of some of these embodiments will now be described in further detail. Referring to FIG. 8b as an example, the cable 800b may include multiple layers 801a-e of conductors. That is, in some examples, the conductive belt 800b may include a first bundle 805 and a second bundle 810 of electrically conductive fibers 802, the second bundle being layered over the first bundle. A third bundle 815 of electrically conductive fibers 802 may be disposed radially about the outer surface of bundle 810. This process may be repeated to obtain the desired flexibility, strength, and/or conductivity of the cable belt 800b. As will be understood, non-conductive fibers (e.g. high strength polyaramid fiber) may of course be used in any of the bundles or between the bundles, as previously described. Additional coatings or layers, such as fatigue resistant polymer coatings, may be provided on any surface, including surfaces of the individual strands or a surface of any of the bundles 805, 810, 815, etc. or the outer surface of the conductor belt. In some examples, the cable 800b may include one or more ring, helical, other external structures 820, which may for example be made of a more durable material than the conductive fibers themselves. The exact protective coating materials, or materials for the ring structures 820 may be selected based on any techniques known in the art, and may be based in part on tradeoffs between conductive performance and structural performance of the belt.

It will be appreciated by persons skilled in the art that numerous other variants of the structures depicted FIGS. 8a, 8b, 8c, 8d, and 8e may be practiced without departing from the spirit and scope of embodiments disclosed herein. For example, the endless wire rope belt 800a of FIG. 8a may be implemented to have strands fabricated from more than one material (e.g. copper alloy strands supported by a central stranded Kevlar core). The protected wire rope belt 800b of FIG. 8b may be sealed and impregnated with lubricant, as examples, to minimize internal mechanical wear. The "multi-layer helical" belt 800c of FIG. 8c may be fabricated from windings of a non-circular cross-section (e.g. triangular, square, rectangular, trapezoidal, hexagonal, etc.). The "multi-layer helical stranded core" belt 800d of FIG. 8d may be fabricated using right-handed windings, left-handed windings, alternating left/right-handed windings, or any combination thereof. The individual elongated elements 818 forming the wire rope core 816 of the hybrid belt 800e in FIG. 8e may each comprise a wire rope as described herein, which in turn may be formed of bundles of smaller diameter wire ropes, etc. Any combinations of the features described in reference to FIGS. 8a, 8b, 8c, 8d, or 8e, as well as other descriptions of belt structures, may be incorporated in any of the belt structures described herein. And more generally, it will be understood that all of the embodiments described thus far and described hereafter are intended to be representative rather than limiting, and may be used in various combinations without departing from the scope and spirit of the subject matter disclosed herein. Likewise, examples discussed thus far entail the use of belts having a nominally circular cross-section. As will be understood, a belt of nominally square cross section, or other suitable shape may be used if desired or advantageous. The extensive discussion of belts having a nominally circular cross section contained herein should not be construed as limiting in any way.

In some examples, in order to further reduce wear, the exterior surface of the belt and/or individual ribs may be provided with a protective coating. Wear may further be minimized, while maintaining low electrical contact resistance by the use of solid and/or liquid-phase lubricants. For example, solid lubricant coatings may include thin films of low shear-strength metals (e.g., Au, Ag), thin solid lubricant coatings, and recently developed metal dichalcogenide composites (e.g., Au—$MoS_2$), which can be used to maintain adequately low electrical contact resistance while also reducing wear. Such coatings can be deposited on complex shapes using a number of known manufacturing processes, including traditional electroplating or physical vapor deposition (PVD) techniques such as evaporation or sputtering, and chemical vapor deposition techniques, such as atomic layer deposition (ALD). Solid lubricant composites such as Au—$MoS_2$ may mitigate friction and wear by formation of transfer films consisting of basally oriented platelets of the metal dichalcogenide. While these are semiconductors and may general increase contact resistance compared to a metallic contact at the same pressure, any detrimental effect on contact resistance may be mitigated by allowing operation at higher contact pressure.

Figure 9:
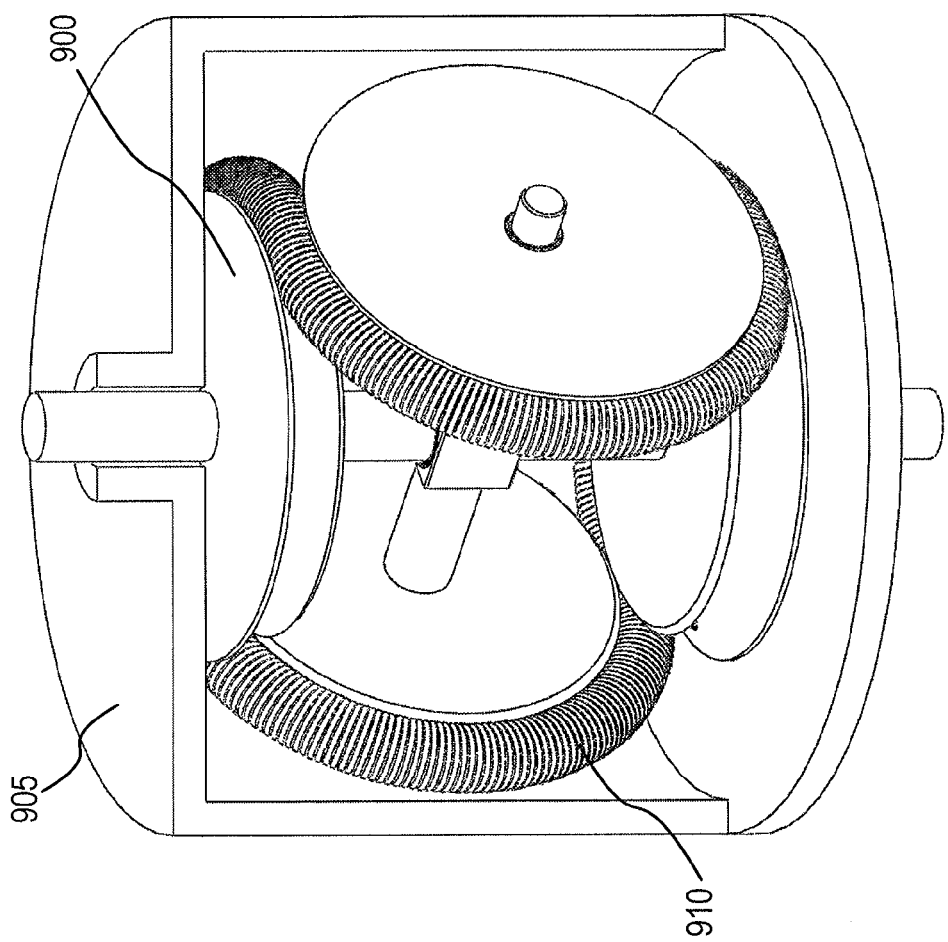
FIG. 9 shows an example rotary electrical connector provided in an enclosure according to the present disclosure.

The device architectures described herein may minimize or virtually eliminate macroscopic sliding contact between a stationary and rotating member, and may therefore result in a large reductions in overall wear rate as compared to conventional brushes and slip rings. Furthermore, example devices may effectively suppress electrical arcing by maintaining continuous electrical contact at all times over a large contact area (e.g., minimizing or virtually eliminating contact bounce which is common in slip rings and brushes). In some examples, the device (e.g. rotary electrical connector) 900 may include an enclosure 905, such as that shown in FIG. 9, to prevent contamination of the operational environment of the rotary contact device, for example. The device 900 may include many of the same components as device 100, for example, or other combinations of features as described herein. Accordingly, for brevity, a detailed description of the device 900 will not be repeated.

As can be appreciated, particulate contamination which may be caused by particles generated within or external to the device 900, and which may be insulating or conductive, may adversely affect performance. Accordingly, the use of an enclosure 905 and/or use of surface lubricants may be desirable. In addition to shielding the contacting surfaces as described above, the use of fluid lubricants can also help mitigate the effects of contamination by removing heat and debris from the contacts. Control of atmospheric species in the operating environment may also be used to reduce wear and increase the interfacial current carrying ability of electrical contacts. Purging of the enclosure 905 with dry, non-reactive, or inert gases may also be implemented. Purging may further include the use of reactive atmospheres such as humidified $CO_2$, which may reduce oxidation at the contact surfaces, or various reducing agents. Vapor phase lubrication (VPL), in which a low concentration (~few hundred ppm) of an organic molecule is added to the operating environment, may also be effective in eliminating wear. For example, linear alcohol vapors may be used to lubricate the contact surfaces.

In some examples, the enclosure 905 may also be filled fully or partially with one or more liquid agents adapted to various functions such as flood lubrication, liquid cooling, or gravimetric segregation of contaminant species. For example, in some embodiments an enclosed Twistact (e.g. device 900) may operate immersed in a non-polar liquid of lower density than water that may provide lubrication at the belt/sheave interfaces, lubrication internal to the belt structure 910 (e.g. internal to a stranded wire rope belt), transfer of heat from the belt to the surrounding liquid, and/or gravimetric separation of atmospheric contaminants such as aqueous aerosols and/or internal contaminants such as metal particulates generated by wear. Such an enclosure may also incorporate elements such as skimmers, filters, dessicants, getters, dross inhibitors, and other elements adapted to sequester, neutralize, and/or prevent the formation of contaminant species. Such an enclosure may further include a (e.g. funnel-shaped) collector for non-buoyant particles, foreign matter, or other such contaminants that may be periodically drained (e.g. by opening a valve) if desired.

Electrical interface assemblies for motors/generators are now described, examples of which may include a drive shaft of the motor-generator rotor, and a rotary electrical interface including a stationary portion rotatably coupled to a rotary portion, the rotary portion including an epicyclic member and a rotating member coupled to the drive shaft, wherein the epicyclic member is configured to revolve around an axis of the stationary portion, the rotary electrical interface further including a first belt configured to provide continuous rolling contact between the stationary portion and the rotary portion for electrically coupling the stationary portion to the rotary portion. The electrical interface assemblies described herein may find use in any application where coupling between a stationary and rotating (or intermittently rotating) member is desired, or for the purpose of making an electrical connection between two rotating members that may rotate at different speeds and/or in different directions. Some example applications will be described in further detail below.

As is known in the art, the shaft of a typical wind turbine turns at a rate which may be much slower than the desired frequency of current to be delivered to the electrical grid (e.g. 60 Hz in US, or 50 Hz elsewhere in the world). In conventional wind turbine power plants, a mechanical transmission (e.g. based on a multi-stage gear box) may be used to increase shaft speed to that required to operate a conventional electrical generator (e.g. an induction generator operated in the vicinity of 1500 to 1800 rpm). However, the mechanical transmissions of large wind turbines are subjected to enormous mechanical loading which may lead to premature wear and failure of transmission components. Maintenance and/or replacement of transmission components may be very costly as access to the components may be difficult, particularly in the case of wind turbines deployed offshore. As such, mechanical transmission solutions may be considered a weak link with respect to the longevity and reliability of large wind turbines. This has spurred efforts to eliminate gear boxes altogether in favor of direct drive generators, wherein the rotor of the generator rotates at the same speed as the turbine blade assembly (e.g. of order 10 rpm in the case of multi-MW wind turbines).

The economies of scale for wind power relative to electricity generated by combustion of coal and natural gas may require that individual wind turbine capacity be scaled up to 5 to 20 MW. But low-rpm direct-drive electrical generators may be required for such multi-MW wind turbines to circumvent the use of a gear box. This in turn may require the use of a high-pole-count synchronous generator, because high-pole-count induction generators may have extremely poor power factors. Two options for implementing high-pole-count synchronous generators may entail the use of either permanent-magnet rotors or wire-wound rotors.

A fundamental advantage of permanent-magnet rotors is the avoidance of brushes and/or slip rings required in wire-wound-rotor generators. Most importantly, the limited reliability and service lifetime of such rotary electrical contacts may preclude their use in wind turbines deployed in off-shore and remote locations, which may be where most of the high-quality wind resources are located, and where the "not-in-my-back-yard" problem is typically more tractable. However, in recent years concerns have been raised about the commercial viability of wind turbines based on rare earth magnet rotors; it is estimated that 96% of rare-earth metal production is in China, and in 2011 the market witnessed a nearly ten-fold price increase in some of these strategic materials. There is, however, no intrinsic need for permanent magnets in such generators. Thus, there exists a need for a viable solution to the rotary electrical contact problem, which has alluded those skilled in the art, despite intensive research over the past 190 years since the invention of the electrical motor/generator. Example devices and assemblies as described herein may enable wire-wound-rotor wind turbines to become the de facto standard for large-scale wind turbines.

Figure 10:
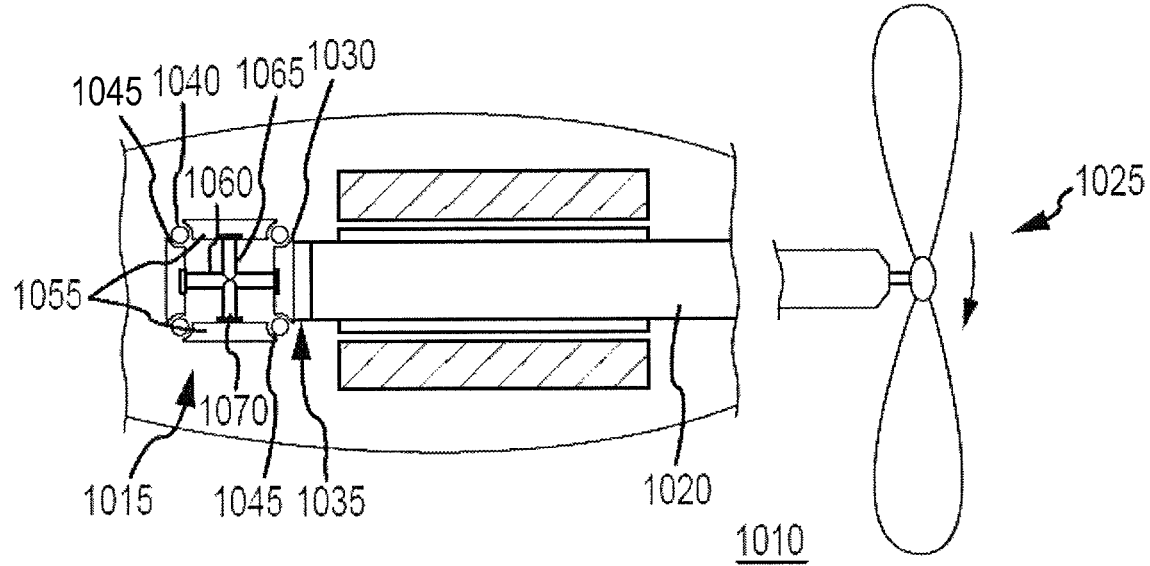
FIG. 10 shows a schematic of a rotary electrical contact coupled to the end of a rotating shaft according to examples of the present disclosure.

FIG. 10 shows a schematic illustration of an assembly 1010 including a rotary electrical interface 1015 provided in series with the drive shaft 1020 of a wind turbine 1025. The rotary electrical interface 1015 may be implemented using rotary electrical contact devices in accordance with embodiments of the present invention. In the example of FIG. 10, a rotating disk 1030, which may be part of the rotary electrical interface 1015 may be attached to a rear portion 1035 of the shaft 1020. In this configuration, the disk 1030 may rotate synchronously with the speed of shaft 1020 (e.g. about 10 rpm for example, as may be representative of a typical multi-megawatt direct-drive wind turbine). The stationary portion of the interface may include the base disk 1040 with one or more sheaves or channels 1040 formed thereon for receiving the conductive belt 1045. The rotary portion of the interface may also include a pair of epicyclic disks 1055, each having a similar sheave 1040 formed along a peripheral edge of each epicyclic disk 1055. The disks may be coupled together and maintained in this configuration by carrier arms 1060 and 1065 intersecting at a center portion 1070. Rotation of the shaft 1020 of the wind turbine may be transmitted to disk 1030, and to the epicyclic disks 1055, which are configured to simultaneously rotate and orbit around the base disk 1040. As previously described, a conductive belt 1045 may be used to maintain a rolling contact between the base disk rotating disk and the epicyclic disks 1055. Configurations and functionality of the disks and belt have previously been described, and for the sake brevity will not be repeated. As described later in conjunction with FIG. 12c and FIG. 12d, typically two or more parallel electrically isolated connections between the stationary and rotating frame would be used in such an application.

Figure 11:
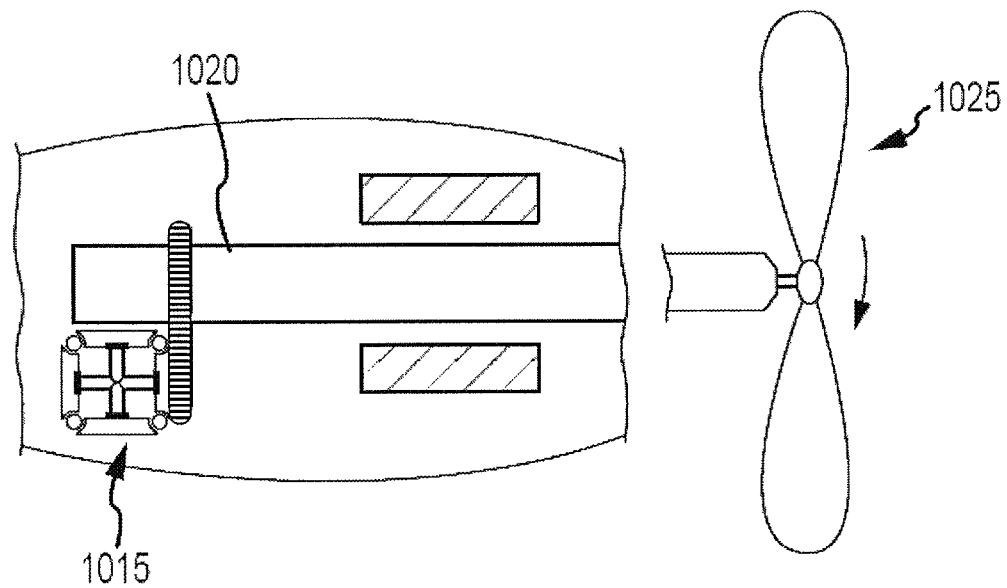
FIG. 11 shows a schematic of a rotary electrical contact coupled parallel to a shaft according to examples of the present disclosure.

As can be appreciated, in some applications, the back end (e.g., rear portion 1035) of the drive shaft may be inaccessible due to space constraints or other design considerations. In such cases it may be advantageous to provide the rotary interface 1015 in parallel with the shaft 1020 of the wind turbine 1025 or motor/generator, as shown in FIG. 11. The device 1015 may be a single-channel rotary interface, or it may be a multi-channel (or multi-sheave) configuration, described in further detail with reference to FIGS. 12a-12d.

Figure 12A:
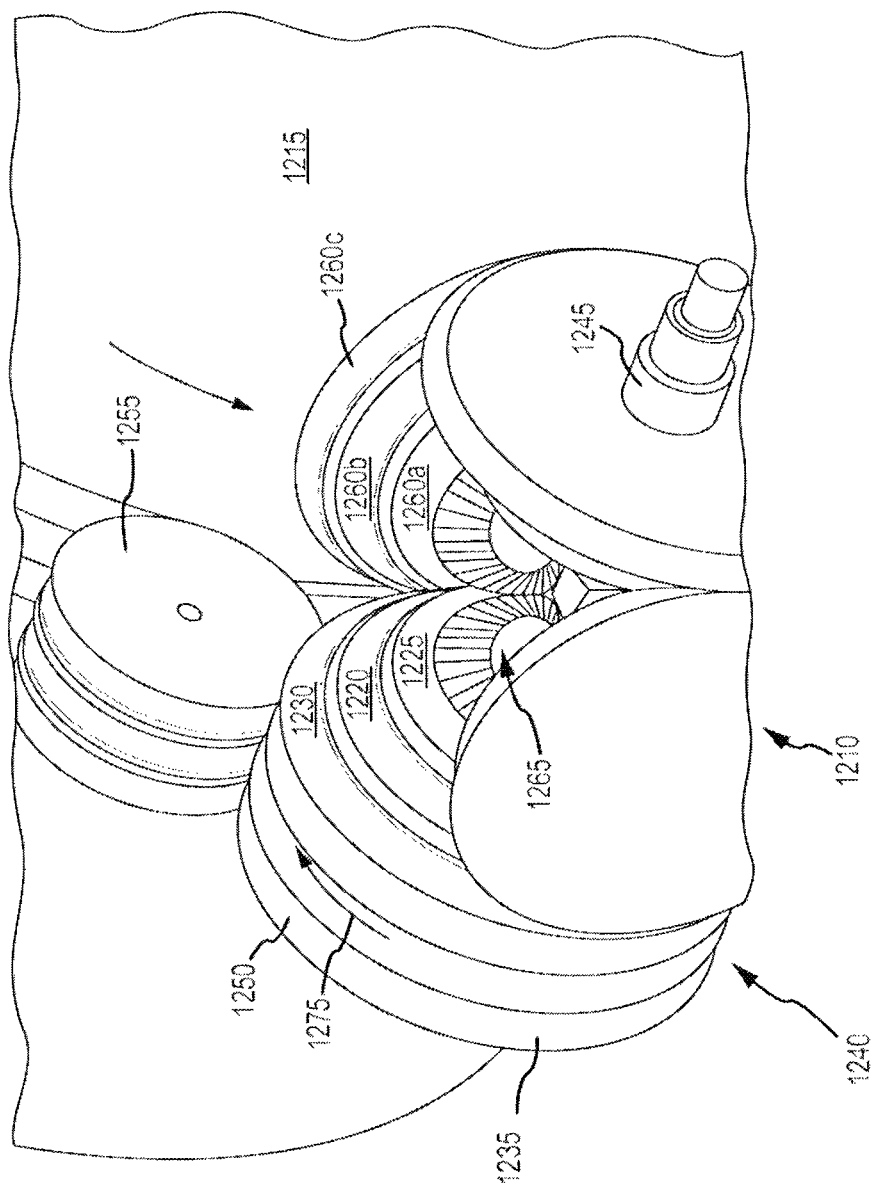
FIG. 12a shows an exemplary assembly including a multi-level pulley configuration for transmitting current from a stationary portion to a rotating portion.

FIG. 12a shows an example assembly 1205 with a multi-channel configuration according to embodiments or the present invention. In this example, the electrical coupling device 1210 is provided in parallel with the drive shaft 1215 of a motor/generator wherein the shaft 1245, which couples the rotating disk 1265 and the stationary disk 1270, is not in-line with the axis of the drive shaft 1215 but is instead parallel to the drive shaft 1215. The device 1210 may include a number of similar components as previously described, the description of which will not be repeated. The multiple-sheave device 1210 may be further provided with a plurality of conductive belts 1220-1230 of any suitable configuration described herein.

In some examples, the assembly 1205 may further include a pulley 1235 which may be coupled in-line with the rotating member 1240 of device 1210, and a belt 1250, disposed about the shaft 1215 of the motor-generator rotor to the pulley 1235. The belt assembly 1250 may include one or more conductive belts, which may be seated in one or more parallel grooves circumferentially disposed on the surface of the shaft. If needed, one or more idler pulleys 1255 may be used for tensioning the assembly.

The idler pulleys 1255, which as mentioned may be used to regulate belt tension, may also serve the dual function of improving electrical performance. As will be understood, in some examples, the one or more idler pulleys 1255 may be made, at least in part, of an electrically conductive material.

The idler pulleys may therefore serve to conduct current as it is being transmitted to and from the shaft 1215. As will be appreciated, the pulleys (e.g. sheaves) in the devices and assemblies described herein typically have electrical resistance which may be far less than the resistance of the conductive belt along the length of the belt. Accordingly, it may be advantageous, especially for high current operation, to minimize or avoid transmitting current through a long isolated span of belt as this may entail much higher series resistance than current being transmitted principally in the transverse direction across the belt.

Figure 12B:
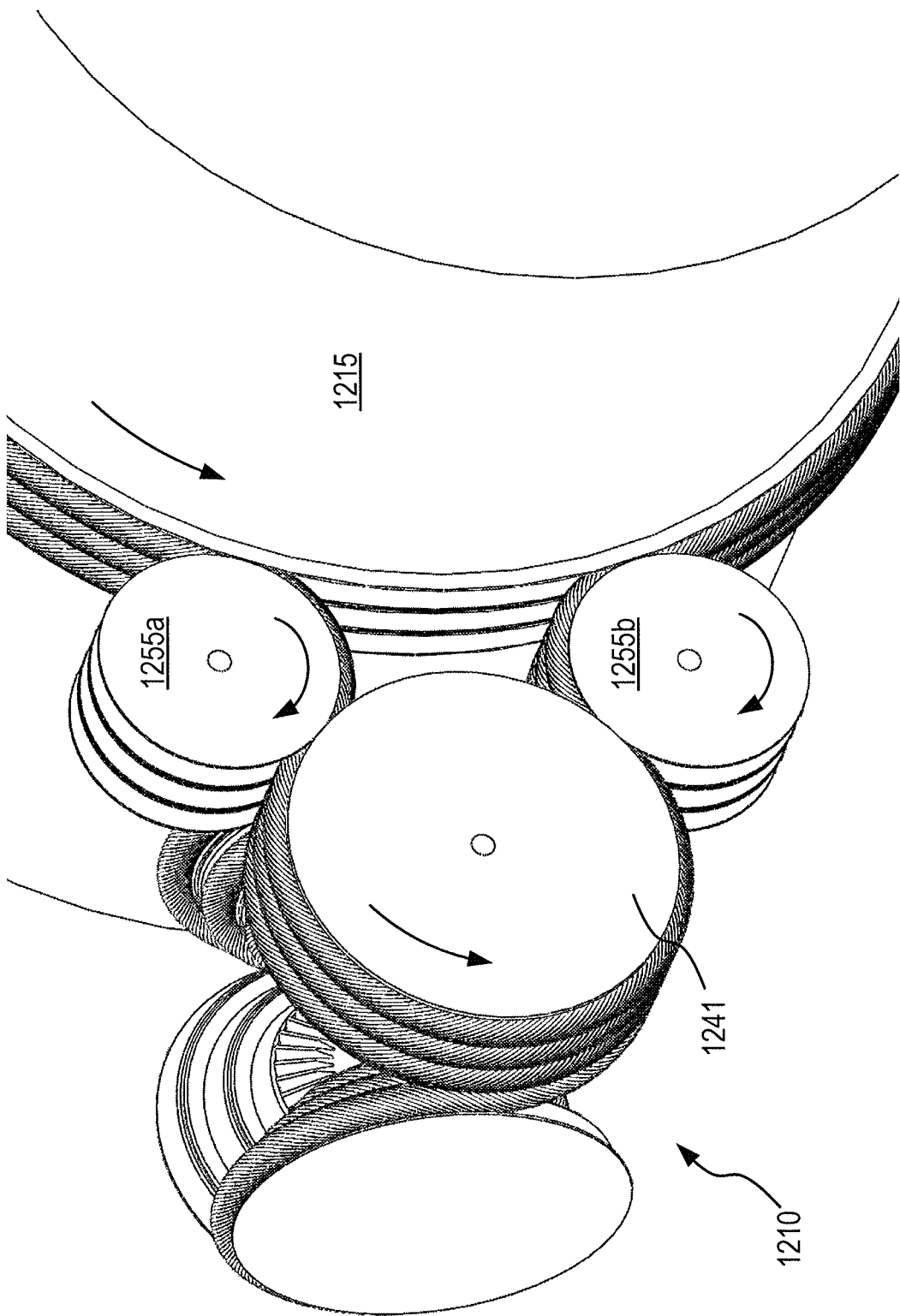
FIG. 12b shows another example of an assembly with a multi-channel rotary electrical connector according to embodiments or the present disclosure.

Incorporating idler pulleys 1255, which are at least in part conductive, may provide a desirable shorter path length for current being transmitted through the belt. That is, in examples, most of the distance that current travels may be confined to the conductive pulleys having extremely low electrical resistance, with the current only briefly passing through the belt before once again entering a solid copper pulley, for example. The use of conductive or partially conductive idler pulleys 1255 may facilitate this type of conductive path thereby enhancing the electrical performance of the device. For example, and as shown in FIG. 12*b*, instead of a long span of free hanging belt, the vast majority of the distance between pulley 1241 and shaft 1215 is accounted for by pulleys 1255*a*, 1255*b*, which may be made of solid copper. An isolated (e.g. free hanging) span of belt not in contact with one or more pulleys or sheaves may also be undesirable from the standpoint of heat sinking, thus the example configurations described with references to FIGS. 12*a* and 12*b* address this further concern. It will be appreciated, that while idler pulleys 1255 may be provided in some examples, in some applications, for example low current applications requiring a connection between widely spaced apart shafts, the idler pulleys may be omitted.

The sheaves 1260, and/or portions of the conductive belts 1220-1230, as well as each of the belts 1250, if desired, may be insulated from each other such that multiple independent electrical paths may be provided using the multi-sheave design. For example, sheave 1260*a* may be electrically insulated from sheave 1260*b*, which may be insulated from sheave 1260*c*. An electrical signal may be coupled between sheave 1260*a* and the smaller of the disks (which is part of the rotating portion 1240), via the conductive belt 1225. A different signal (e.g. a signal having a different value or being provided from a different source) may be coupled between sheave 1260*b* to the middle disk of rotating portion 1240 via the conductive belt 1220. And a third signal may be provided to the top disk of rotating portion 1240 via the belt 1230. The three signals may of course be of the same value or from the same source thereby increasing the current carrying capacity of the device. In some examples, the signals may be provided in opposite directions, e.g. signal conducted via belt 1230 may be provided from shaft 1215 to stationary disk 1270, while signal via belt 1225 is being provided from stationary disk 1270 to the shaft 1215. Many possible combinations and variations of applying electrical signals between stationary and rotating components will be appreciated in view of the present disclosure.

One or more of the disks (or pulleys) which form the rotating portion 1245 may be electrically insulated from each other and insulated paths may be formed through the thickness of one or more of the disks such that the individual paths may be coupled to other portions of the device. For example, a conductive path may be formed from bottom disk 1265 to any one of the pulleys 1235, using an insulated conductor which passes through the thickness of the middle and/or top disks of 1240. This is possible because rotating portion 1240 and pulleys 1235 may rotate synchronously in the direction shown by arrow 1275 (or in the reverse direction). Thus, once the electrical signal is delivered to the rotating portion 1240, any number of independent electrical signals or paths can be provided to one or more of the pulleys 1235 and correspondingly to one or more paths on the drive shaft 1215.

In some examples, the assembly may include a plurality of electrical interfaces as described herein. For example, the assembly may include a first rotary electrical interface and a second rotary interface, the first rotary electrical interface being configured to flow current in a first direction, and the second rotary interface is configured to flow current in a second direction different from the first direction. That is, in some examples, the first rotary interface can be used to flow current from a power source and to a conductor or circuit coupled to the drive shaft, which as will be appreciated may rotate during rotation of the rotor. The second rotary interface can be used to flow current from the rotating frame (e.g. the conductor or circuit on the drive shaft) back to the stationary frame (e.g. a circuit configured to remain stationary with respect to the drive shaft) thereby providing a closed electrical circuit. Of course it will be understood that a closed electrical circuit may be achieved using a single rotary interface, for example by using the two-channel (two-sheave) configuration of FIG. 12*c*. One or more of the rotary electrical interfaces may be coupled in series, in parallel, or combinations thereof.

The first and/or second rotary electrical interfaces may be configured according to any of the examples described and may be implemented as single channel and/or multi-channel configurations. Any of the plurality of electrical interfaces may be positioned anywhere about the shaft 1215, for example they may be placed on opposite sides of the shaft, or some may be coupled in series with the shaft 1215 while others are coupled in parallel, as described. Multiple rotary interfaces may also be coupled to each other in series (e.g. by co-axially connecting either the stationary disk 1270 to a stationary disk of another rotary interface, or by connecting the rotating disk 1265 to the rotating portion of the other rotary interface). Other possible coupling arrangements will be appreciated by those skilled in the art in light of the present disclosure.

Much of the above can be further clarified by considering specific application examples. FIG. 12*c* shows a two-channel Twistact 1280 that may be used to provide dc excitation to a singly-fed, wire-wound-rotor, synchronous motor or generator (not shown). In such an application, the wire-wound-rotor may comprise one or more dc electromagnets that may provide the functionality of rare-earth permanent magnets (e.g. the creation of a static magnetic field distribution in the rotating frame at magnetic flux densities of order 1 Telsa). The ability to fabricate such a rotor from commonly available materials such as copper and steel rather than rare earth elements may be achieved by some embodiments as described herein. The ability to vary the strength of a rotor's magnetic field to vary the power factor of the synchronous generator (e.g. for power factor correction of the electrical grid or portions thereof) is also important advantage of wire-wound rotors in many applications. The device 1280 (e.g. Twistact) depicted in FIG. 12*c* includes many of the same components as previously described, such as a stationary sheave 1281, a rotating sheave 1282, and a pair of orbiting sheaves 1283, 1284, each of the sheaves being provided in a two-channel configuration to receive two conductive belts 1285, 1286. In examples, electrical insulation 1287 may be provided between each of the channels as well as between respective portions of the shaft 1288 of the device 1280.

Figure 12D:
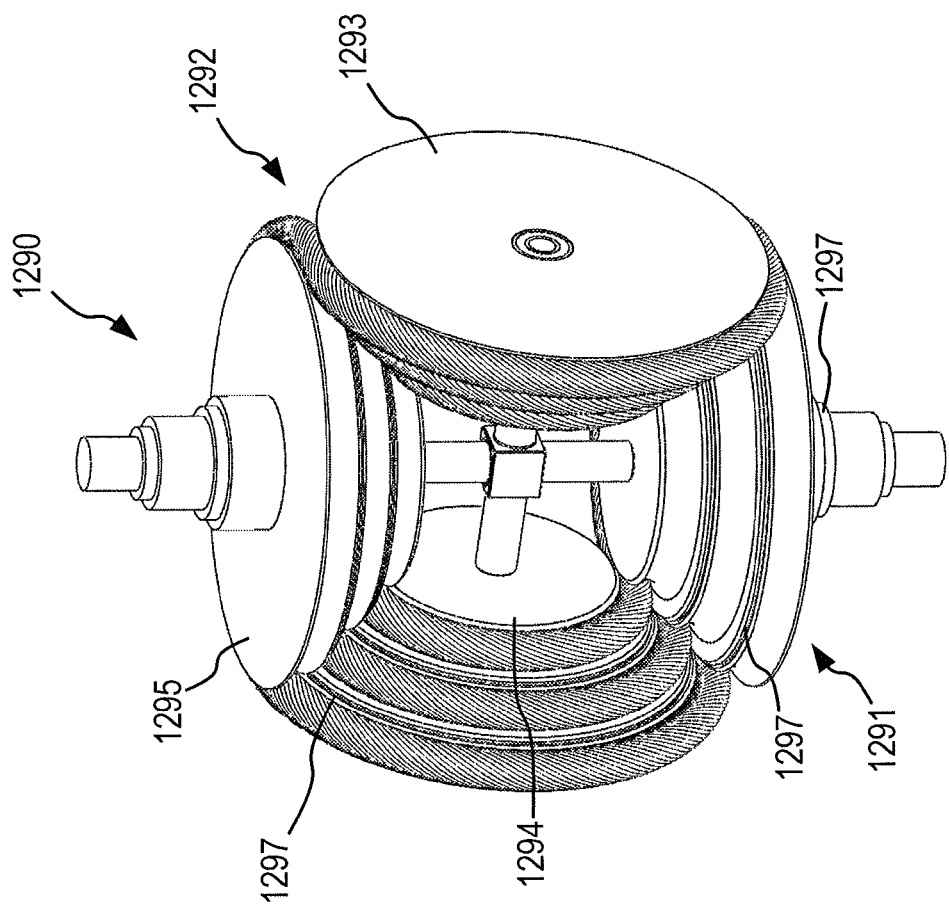
FIG. 12d shows a three-channel Twistact (e.g. rotary electrical contract device) that may be used to provide three-phase excitation to a doubly-fed, wire-wound-rotor synchronous motor or generator.
Figure 12C:
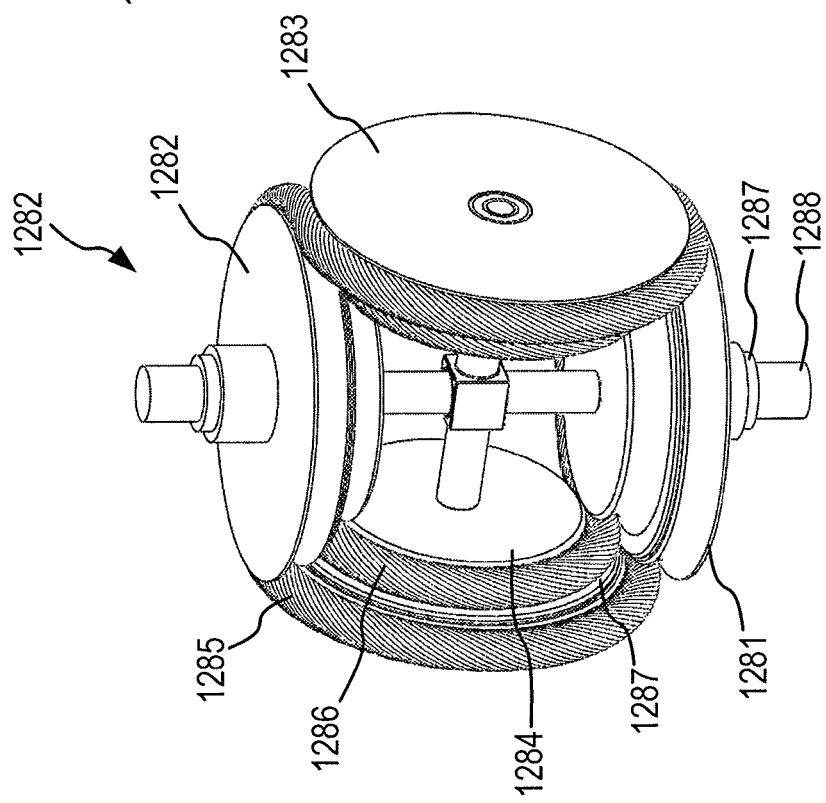
FIG. 12c shows a two-channel Twistact (e.g. rotary electrical contract device) that may be used to provide dc excitation to a singly-fed, wire-wound-rotor, synchronous motor or generator.

FIG. 12d illustrates a three-channel Twistact 1290 that may be used to provide three-phase excitation to a doubly-fed, wire-wound-rotor, synchronous motor or generator (not shown). In a doubly-fed motor/generator, rather than generating a magnetic field distribution that is stationary in the frame of reference of the rotor, application of a 3-phase (e.g. sinusoidal) waveform to a 3-phase rotor winding allows the rotor to generate a rotating magnetic field analogous to that of a conventional 3-phase stator. Thus when the rotor is viewed from the stationary frame of reference of the stator, the rotation rate of its magnetic field will be the sum of the mechanical rotation frequency of the rotor and the electrical rotation frequency of the rotor. In an application such as wind power, the primary advantage of such doubly fed synchronous generators is that they may provide more than a three-fold reduction in the required AC-to-DC-to-AC inverter capacity. In addition, as with a singly-fed synchronous generator, the doubly-fed synchronous generator may also provide the valuable function of power factor correction (sometimes referred to as "grid restoration"). Similar to the example in FIG. 12c, the device 1290 depicted in FIG. 12d includes many of the components of devices previously described, and for brevity their description will not be repeated. The device 1290 is implemented in a three-channel sheave configuration, having a stationary portion 1291, and rotary portion 1292, which includes a pair or planetary or epicyclic members 1293, 1294 and a rotating member 1295. As in the example in FIG. 12d, insulation 1297 may be provided as shown.

As mentioned earlier, there are also applications in which all of the n channels in an n-channel belt may be connected electrically in parallel for the purpose of increasing current carrying capacity. For example, referring to the 3-channel device of FIG. 12d, elimination of the insulating spacers 1297 between sheaves would provide a single-channel device wherein the width of the current carrying is triple that of a conventional single-channel Twistact such as that shown in FIG. 1. In effect, such a multi-sheave embodiment allows the use of a wide flat belt, albeit divided into multiple adjacent sections. In addition to increased current carrying capacity, built in redundancy against belt failure may be a further objective of such an embodiment.

As discussed earlier, the methods and devices described herein, may offer numerous advantages over the prior art. For example, unlike conventional devices based on graphite or graphite-metal-composite blocks, precious metal brushes, etc., there is no macroscopic sliding contact and no intermittent open circuiting of the contact to produce electrical arcing. Also, unlike conventional slip-rings based on rollers, ball bearings, etc., instead of point or line contact (which may result in prohibitively large electrical current densities and electrical arcing), electrical contact in devices according to the present disclosure may be continuously maintained over a very large geometric area ($A_{contact} = \pi^2 r_{belt} r_{pulley}$, where "r" denotes radius).

The rotary contact devices according to examples described may be capable of extremely high currents because, for example, (1) electrical conduction through the belt may be in a generally transverse rather than longitudinal direction (and the electrical resistance of the solid copper pulleys may be generally negligible); (2) the effective duty cycle for electrical conduction through a given volume element of the moving belt may be very low (of order $r_{belt}/r_{pulley}$); (3) two parallel conduction paths achieved may reduce the overall electrical resistance of the device, (4) the Twistact may be fabricated from materials having very high intrinsic electrical conductivity (e.g. copper rather than graphite), and (5) the Twistact may be fabricated from materials having very high thermal conductivity such as copper (e.g. rather than graphite), which may facilitate heat spreading (e.g. from the belt to the pulleys). Pulleys may further incorporate cooling fins if desired.

With regard to mechanical wear, as previously described, the conductive belt may not need to transmit any substantial force in performing its function. Furthermore, and if desired, a rigorous no-slip condition may be enforced by incorporating some form of positive drive such as bevel gear teeth as described herein. In this case the belt merely "goes along for the ride" under sufficient tension to maintain reliable electrical contact.

With regard to current carrying capacity, consider the application of such a rotary contact device technology for the generator of a multi-MW wind turbine. The electrical current that must be transmitted to the rotor shaft may be of order 1000 A. Some of the belt designs described herein may approach the conductivity of solid copper. Given that the current carrying capacity of a 1-cm-diameter round copper bus bar in still air is 310 A (assuming a maximum allowable temperature rise of 50 C), a rotary contact device using the wire rope belt design shown of FIG. 8b, for example, with $r_{belt}/r_{pulley}=10$ may have a current handling capability of order 3 kA in a package the size of a 10-cm cube. Further increases in current handling may be obtained through convective cooling of the rotating structure and moving belt, the introduction of cooling fins, permitting operation at further elevated temperature, and/or immersion cooling. Current handling capability may be scalable approximately according to $r_{pulley}^2$, in which case roughly an order of magnitude increase in current handling capability may be obtained by increasing the rotary contact device dimensions from 10×10×10 cm to 30×30×30 cm. In the context of a multi-MW wind turbine, such a three-fold increase in linear dimensions would have negligible implications. Even in the case of a hollow single-layer helical spring belt, a rotary contact device the size of a 10 cm cube may have a current carrying capacity of order 1 kA.

There are many important applications other than large scale wind turbines which may be enabled by the disclosed subject matter. For example, the homopolar motor/generator, invented by Michael Faraday in 1831, is widely considered to be the simplest possible electric motor/generator architecture ever conceived of. It also has the distinction of being the only "pure DC" machine; the interaction of DC current and a static magnetic field yields motor/generator action on a continuous basis. This is in marked contrast to all other motor/generator architectures, even those commonly referred to as DC motors/generators. All such motor generator architectures entail interaction of time varying magnetic fields so as to generate mechanical or electrical power that fluctuates in time. For example, consider an elementary brushed DC motor. Rotation is generated in discrete steps, wherein a single step corresponds to rotation of the rotor by 180°. The electrical current delivered through the plus and minus terminals of the motor is provided by a DC power supply. The brush assembly transmits current to and from the rotating frame, and in conjunction with the commutator, converts the output of the DC power supply to a current waveform that approximates a symmetrical square whose frequency is equal to the frequency at which the rotor spins (and properly phased to coordinate continuous rotation). The same is true of devices such as "DC brushless motors", which run off of a DC power supply but actually entail to generation of one or more time varying magnetic fields (often 3-phase excitation), typically at relatively high frequency.

Whether in reference to such conventional DC motors/generators, or motor/generator systems that run off of or supply alternating (e.g. sinusoidal time varying) current, the presence of such time varying magnetic fields may introduce many difficulties from the standpoint of motor efficiency, performance, construction, and choice of materials. Important unwanted physical effects may include power loss (and overheating) due to generation of eddy currents in electrically conductive soft magnetic materials such as iron, magnetic hysteresis losses associated with the fact that commonly used magnetic core materials are not strictly speaking, magnetically soft materials, and added resistive losses in conductors due to the skin effect (or requirements for small diameter windings to mitigate the skin effect); at 60 Hz the skin depth for copper is 8.5 mm. Eddy current considerations typically necessitate the use of finely laminated, rather than monolithic, magnetic core structures, and the use of special soft magnetic materials engineered for low electrical conductivity such as ferro-silicon alloys. The presence of time varying fields also introduces a number of problems related to the fact that a typical motor/generator, or portions thereof, represent highly inductive electrical loads. One immediate consequence is less-than-unity power factor, which lowers the efficiency with which electrical power can be delivered to (from) the motor (generator), and poses significant problems for electrical power grid management.

Many AC motors, such as synchronous motors and single-phase induction motors have the further disadvantage that they are not self starting. For example, in the case of single-phase induction motors, technologies developed to solve the self-starting problem include split-phase induction motors, capacitor-start split-phase induction motors, permanent capacitor split-phase induction motors, two-value capacitor induction motors, autotransformer/capacitor induction motors, shaded-pole induction motors, and repulsion-start induction motors. All of these approaches (to generating a non-zero rotating component of the stator's magnetic field, so as to provide self-starting) have significant disadvantages from the standpoint of complexity, degradation of motor performance, and/or degradation of motor efficiency. Synchronous motors running off of a fixed frequency power supply (e.g. 50/60 Hz line voltage), whether single-phase or polyphase, are also not self starting. In the case of brushless motors, where a variable frequency variable voltage power supply is used (at considerable expense), starting torque may be generated, but start up requires proper coordination of excitation of the (usually three) phases using shaft position sensors. Otherwise, little or no starting torque may be developed. In contrast, a homopolar motor can generate high torque at start up or while stalled without the use of any auxiliary sub-systems, and independent of the angular position of the rotor.

Further advantages of homopolar motor/generator technology include the potential for motors and generators of extremely high efficiency, high specific power density, and low cost construction (e.g. rotors and stator fabricated from single pieces of mild steel rather than assembled form a large number of fine-gauge electrically insulated ferro-silicon laminations). Advantages also include zero torque ripple (very important from the standpoint of audible noise, and avoiding excitation of mechanical resonances), unity power factor operation (because the homopolar motor/generator is a true dc machine), highly desirable and torque-speed characteristics for applications such as electric vehicles, applications in which a field-controlled homopolar motor may provide the functionality of a continuously variable transmission (thereby allowing elimination of mechanical transmission components), and the elimination of requirements for inverters (and associated losses in such circuitry) in applications that may employ a fixed voltage dc bus, such as electric vehicles. Ultra-high-current homopolar generator technology may also be of great interest for applications requiring efficient generation of very high DC current at low voltage (e.g. for electrolytic of production and/or refining of aluminum, copper, alkali metals, halogens, hydrogen, etc.).

But repeated attempts to develop practical homopolar motor/generator technology during the past 190 years have been hampered by the brush problem; homopolar motors and generators typically operate at low voltage and extremely high current, resulting in very short brush lifetime. Attempts to use liquid metal rotary electrical contacts (e.g. mercury, gallium, sodium/potassium alloys) in homopolar motors and generators have met with limited success as well, because of current capacity limitations imposed by material properties (e.g. low electrical conductivity and high viscosity, wherein high viscosity may necessitate the use of a relatively large liquid metal gap between stationary and rotating members to avoid large frictional shearing losses), and a variety of practical difficulties related to handling of such liquid metal alloys (e.g. toxicity, corrosion of wetted metal surfaces, oxide formation, and reactivity with water vapor).

Accordingly, in some embodiments the rotary contact technology disclosed herein comprises a portion of a homopolar motor or generator. Alternatively, rotary contact technology disclosed herein may be used to transmit high current to a DC-to-DC converter residing in the rotating frame of the homopolar motor/generator rotor, wherein such a DC-to-DC converter serves to increase or greatly increase the impedance looking into the leads of the homopolar motor or generator, and restrict transmission of extremely high current levels to the immediate vicinity of one or more points of use in the rotating frame.

Figure 14A:
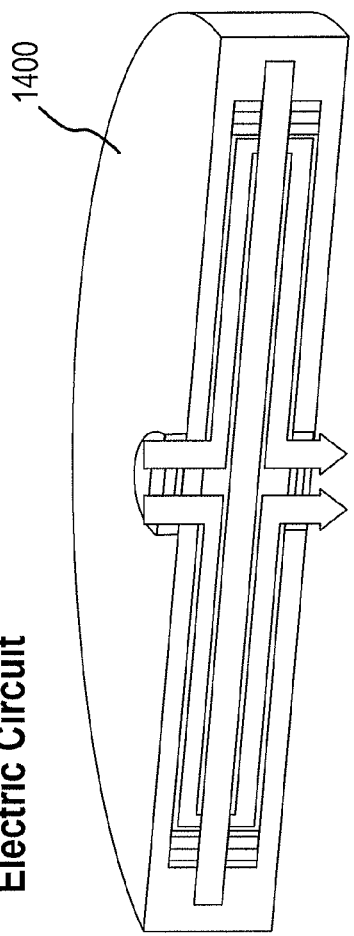
FIG. 14a shows the electrical circuit (e.g. conductive paths) of the homopolar motor/generator module of FIG. 14.
Figure 14B:
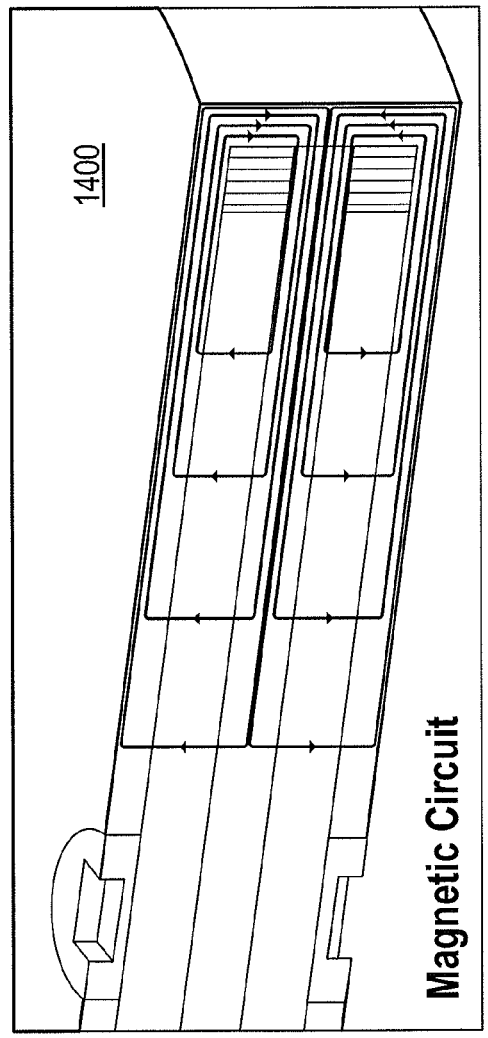
FIG. 14b shows the magnetic circuit of the homopolar motor/generator module of FIG. 14.

FIG. 14 shows a schematic diagram of a disk-type of a homopolar module 1400 according to the present disclosure. As shown in FIG. 14, an example implementation of a homopolar motor/generator incorporating a rotary electrical contact device (e.g. Twistact) according to the present disclosure may include a pair of rotary electrical contact devices (e.g. top Twistact 1410 and bottom Twistact 1420). Each of the devices 1410 and 1420 may be implemented according to any of the examples described herein. The top device 1410 may be coupled to a first shaft keyway 1431 of the rotor 1430, while the bottom device 1420 may be coupled to a second shaft key way 1432. The homopolar motor module 1400 may include a rotor 1430 and a stator 1450, an example of such an arrangement being depicted in FIG. 14. FIG. 14*b* shows the magnetic field resulting from electrical excitation of the stator 1450 of the module. FIG. 14*a* shows the electrical paths for flow of electrical current through the rotor assembly provided by the top and bottom Twistacts (not shown). That is, the top device 1410 (not shown in FIG. 14*a*), the rotary disk of which is coupled to the shaft keyway 1431, may provide an electrically conductive path (e.g. from a stationary source) to the top central portion of the rotor assembly, while the bottom device 1420 (also not shown in FIG. 14*a*) is similarly coupled to the shaft keyway 1432 to complete the circuit by providing a second conductive path from the bottom central portion of the rotor assembly back to the stationary frame of reference.

FIG. 14 illustrates one example of how Twistact technology may be enabling to homopolar motor/generator technology, but the specific homopolar/twistact configuration depicted in the example of FIG. 14 should in no way be construed as limiting. For example, in many homopolar motor/generator configurations known from the prior art, the use of one or more electrical contacts peripheral the outer edge of the rotor, rather than central to the rotor, may be desirable. In such an instance, a peripheral rotary electrical contact arrangement analogous to that shown in FIG. 12B may be used, wherein the rotor of the homopolar motor/generator may be represented by structure 1215.

Figure 13:
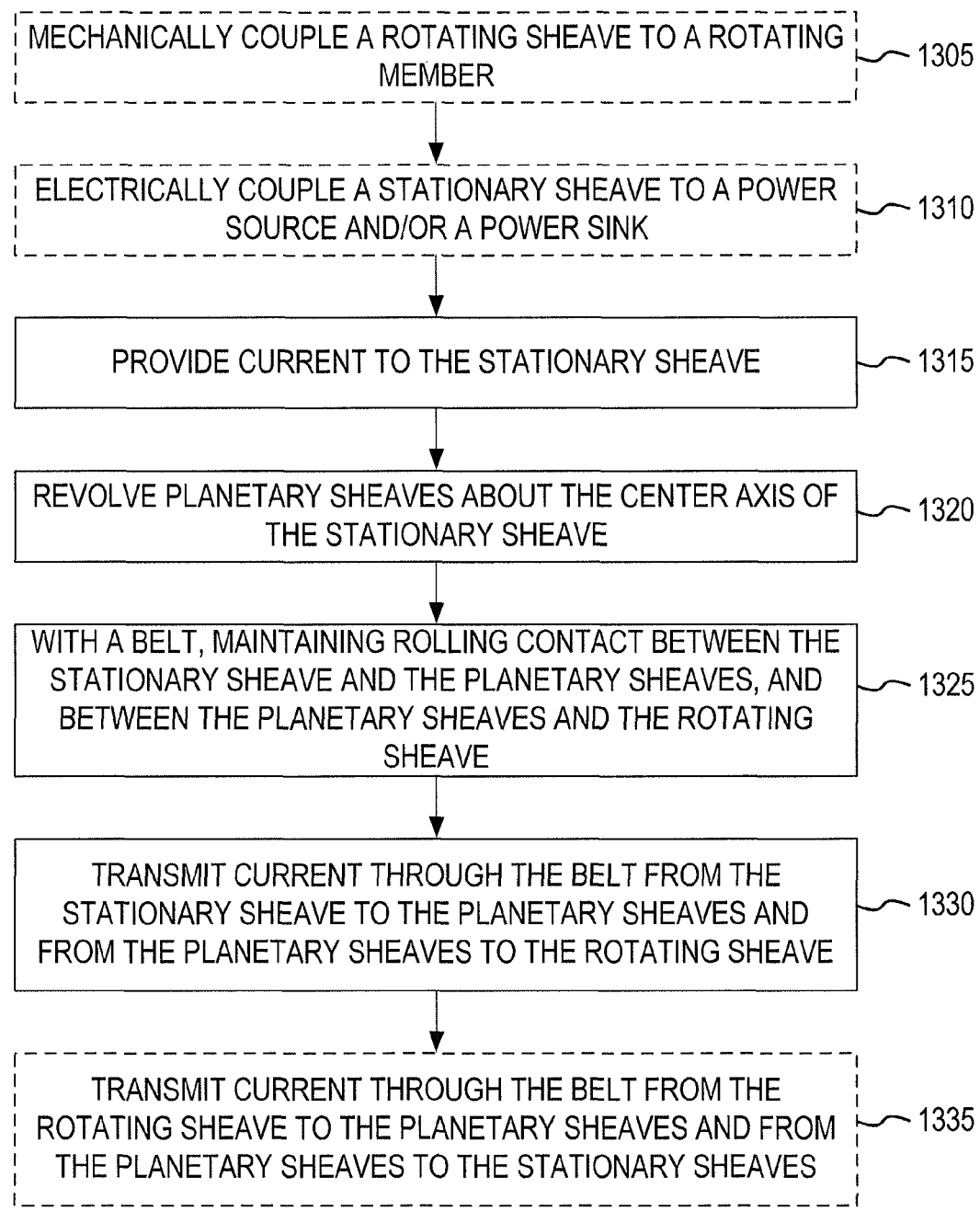
FIG. 13 shows a flow diagram of an example method for transmitting current from stationary body to a rotating body according to the present disclosure.

FIG. 13 shows a flow diagram of a method for providing current between a stationary member and a rotating member according to examples of the present disclosure. Example methods according to the present disclosure may include providing electrical current to a first portion of a stationary disk, as shown in box 1315. The stationary disk may be coupled to a rotating disk and a plurality of planetary disks, as described herein. The method may further include revolving the plurality of planetary disks about the center axis of the stationary disk, as shown in box 1320. As shown in box 1325, using a conductive belt, continuous rolling contact may be maintained between the stationary disk and the plurality of planetary disks, and between the plurality of planetary disks and the rotating disk, which may be coupled to another rotating member. As shown in box, 1230, the method may further include providing current through the belt from the stationary disk to the plurality of planetary disks, and from the plurality of planetary disks to the rotating disk. In examples, the method may further include transmitting current through the belt from the rotating disk to the planetary disks and from the planetary disks to the stationary disk, as shown in box 1335.

Other optional actions may be included, and the actions may be performed in an order other than the one in which they are described in some examples. For example, as shown in box 1305, the method may include, before providing current, mechanically coupling the rotating disk of an electrical coupling device to another rotating member, which may for example be the shaft of a motor generator or the shaft of a wind turbine. In another optional step, the stationary disk of the coupling device may be electrically coupled to a power source and/or a power sink, as shown in box 1310. In some examples the method may further include sourcing electrical current from a battery cell or a utility grid. In some examples, the method may also include sinking current into an electrical storage cell or the grid. In some examples, the method may further include providing power to an electromagnet mounted on or in communication with the rotating member.

In some examples, the revolving may include rotating the rotating disk using a drive shaft of a generator. In some examples, revolving may further include rotating a shaft assembly which couples the plurality of planetary disks to the rotating disk. In some examples, providing current form the stationary disk to the plurality of planetary disks may include rolling a conductive belt about a perimeter of the stationary disk and respective perimeters of the plurality of planetary disks. In some examples, providing current from a plurality of planetary disks may include rolling a conductive belt about the respective perimeters of the plurality of planetary disks and a perimeter of the rotating disk. In some examples, providing current from the stationary disk to the plurality of planetary disks may include current along parallel paths of current from the stationary disk to each of the plurality of planetary disks.

In some examples, devices according to the present disclosure may be used to provide signals having different values along independent conductive paths provided by the device. For example, and as previously described with reference to FIG. 7, the belt may include a plurality of individual insulated conductors each configured to engage with a predetermined location on the contact surface of each pulley. As such, an example method of providing electrical signals may include passing a first signal along a first conductive path defined by an electrical coupling device as described herein, while simultaneously (or at a different time) passing a second signal of different value along a second conductive path provided by the same electrical coupling device. In some examples, the first and second signals may have a same value, but may be provided from a different source.

From the foregoing it will be appreciated that, although specific embodiments of the invention have been described herein for purposes of illustration, it will be understood by those skilled in the art that various modifications may be made without deviating from the spirit and scope of the invention. Accordingly, the invention is not limited except as by the appended claims.

What is claimed is:

1. A device for maintaining electrical contact between a first member and a second member, the first member being configured to move relative to the second member, the device comprising:
   a first sheave configured to remain stationary relative to the first member during operation of the device;
   a second sheave spaced apart from and rotatably coupled to the first sheave, the second sheave configured to remain stationary relative to the second member during operation of the device;
   a pair of orbital sheaves disposed between the first sheave and the second sheave and configured to revolve about the center axis of the first sheave during operation of the device; and
   a belt configured to maintain electrical contact between the first sheave and the pair of orbital sheaves and between the second sheave and the pair of orbital sheaves.

2. The device of claim 1, wherein the second sheave is coupled to a rotating member of a wind turbine or a motor/generator.

3. The device of claim 1, further comprising a first shaft coupling the first sheave to the second sheave, and a second shaft coupling the pair of orbital sheaves.

4. The device of claim 3, wherein the first shaft and the second shaft intersect at a 90 degree angle.

5. The device of claim 3, wherein the first shaft and the second shaft intersect at an angle different than 90 degrees.

6. The device of claim 1, wherein the belt comprises a helical coil spring having a first end and a second end, wherein the first end is connected to the second end to form a continuous closed loop.

7. The device of claim 1, wherein the belt comprises an alternating array of transverse disk members and a plurality of spacers, each transverse disk member being spaced apart by a respective spacer.

8. The device of claim 1, wherein the belt comprises a bundle of elongated electrical conductors which are at least one of twisted, braided, or otherwise intertwined together.

9. The device of claim 8, wherein at least some of the elongated electrical conductors are electrically insulated from one another.

10. The device of claim 1, wherein the belt is configured to apply two or more electrical signals having different values along a plurality of independent conductive paths.

11. A method of providing electrical current to or from a rotating member, the method comprising:
   providing electrical current to or from a stationary sheave;
   revolving a plurality of planetary sheaves about the center axis of the stationary sheave;
   maintaining, with a belt, a rolling contact between the stationary sheave and the plurality of planetary sheaves, and between the plurality of planetary sheaves and a rotating sheave, wherein said rotating sheave is spaced apart from the stationary sheave and configured to rotate relative to the stationary sheave; and providing current through the belt between the stationary sheave and the plurality of planetary sheaves and between the plurality of planetary sheaves and the rotating sheave.

12. The method of claim 11, wherein said revolving comprises rotating the rotating sheave using a shaft of a motor or generator.

13. The method of claim 11, wherein said providing current through the belt comprises rolling the belt about a perimeter of the stationary sheave and respective perimeters of the plurality of planetary sheaves, said providing current through the belt further comprising rolling the belt about a perimeter of the rotating sheave.

14. The method of claim 11, wherein said providing current through the belt comprises providing current along parallel paths from the stationary sheave to each of the plurality of planetary sheaves.

15. The method of claim 11 further comprising providing power to an electromagnet mounted to the rotating member.

16. An electrical interface for a motor-generator, the interface comprising a rotary electrical contact device including a stationary portion and a rotary portion and a belt configured to provide, using a rolling contact, an electrically conductive path between the stationary portion and the rotary portion thereby allowing the rotary portion to maintain electrical contact with a conductor on a rotating member of the motor-generator.

17. The interface of claim 16, wherein a center axis of the rotary portion of the electrical contact device is in-line with a center axis of the rotating member of the motor-generator.

18. The interface of claim 16, wherein a center axis of the rotary portion of the electrical contact device is not in-line with a center axis of the rotating member of the motor-generator.

19. The interface of claim 16 wherein the electrical contact device is configured to provide current in a first direction using a first belt, and further configured to provide current in a second direction different than the first direction using a second belt.

20. The interface of claim 16, wherein the rotary electrical contact device comprises a first pair of opposing sheaves and a second pair of opposing sheaves coupled together by intersecting first shaft connecting the first pair of opposing sheaves and a second shaft connecting the second pair of opposing sheaves, and wherein the belt is disposed about respective perimeters of the first pair of opposing sheaves and the second pair of opposing sheaves and configured to remain in contact with at least a portion of the respective perimeters of the first pair of opposing sheaves and the second pair of opposing sheaves during motion of said sheaves, wherein at least one sheave from the first pair of opposing sheaves or the second pair of opposing sheaves is configured to remain stationary during operation of the device while the remaining disks rotate, and the at least one disk is configured to provide electrical current between the stationary power source and a peripheral surface of the at least one of the rotating disks using the belt.

21. The interface of claim 16, wherein the electrically conductive path between the stationary portion and the rotary portion is used to ground the rotating member.

22. A synchronous motor-generator including the electrical interface of claim 16.

23. A synchronous motor-generator including the electrical interface of claim 19.

24. A homopolar motor-generator module including at least one electrical interface according to claim 16, wherein the electrical contact device is configured to provide, using the belt, a electrically conductive path between a rotor of the homopolar motor-generator and a stationary member.

* * * * *